(12) United States Patent
Ashbacher et al.

(10) Patent No.: US 11,343,571 B2
(45) Date of Patent: *May 24, 2022

(54) CONTENT-MODIFICATION SYSTEM WITH TRANSMISSION DELAY-BASED FEATURE

(71) Applicant: Roku, Inc., San Jose, CA (US)

(72) Inventors: Andrew Laurence Ashbacher, Aptos, CA (US); John L. Haynes, III, Sandy, UT (US); Shuheng Li, Lehi, UT (US); Stefan Matthijs Maris, Brooklyn, NY (US)

(73) Assignee: Roku, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/191,372

(22) Filed: Mar. 3, 2021

(65) Prior Publication Data

US 2021/0195289 A1 Jun. 24, 2021

Related U.S. Application Data

(63) Continuation of application No. 16/836,098, filed on Mar. 31, 2020, now Pat. No. 10,972,794.

(Continued)

(51) Int. Cl.
*H04N 21/458* (2011.01)
*H04N 21/262* (2011.01)
(Continued)

(52) U.S. Cl.
CPC ......... *H04N 21/458* (2013.01); *G06F 16/738* (2019.01); *H04N 21/262* (2013.01); *H04N 21/2668* (2013.01); *H04N 21/26233* (2013.01)

(58) Field of Classification Search
None
See application file for complete search history.

(56) References Cited

U.S. PATENT DOCUMENTS 9,146,990 B2  9/2015  Scherf et al.
9,495,451 B2  11/2016  Harron
(Continued)

FOREIGN PATENT DOCUMENTS

WO     2017044258 A1     3/2017

OTHER PUBLICATIONS

U.S. Appl. No. 16/836,082 Final Office Action dated May 28, 2021.
(Continued)

*Primary Examiner* — James R Marandi
(74) *Attorney, Agent, or Firm* — McDonnell Boehnen Hulbert & Berghoff LLP

(57) ABSTRACT

In one aspect, a method includes determining a content-transmission delay between a content-distribution system and a content-presentation device. The method also includes using at least the determined content-transmission delay as a basis to select, from among a plurality of reference fingerprint data sets, a reference fingerprint data set that corresponds with the determined content-transmission delay. The method also includes transmitting to the content-presentation device, the selected reference fingerprint data set that corresponds with the determined content-transmission delay to facilitate the content-presentation device detecting a match between query fingerprint data representing content received by the content-presentation device and at least a portion of reference fingerprint data in the transmitted reference fingerprint data set.

20 Claims, 12 Drawing Sheets

Related U.S. Application Data

(60) Provisional application No. 62/846,405, filed on May 10, 2019.

(51) Int. Cl.
*G06F 16/738* (2019.01)
*H04N 21/2668* (2011.01)

(56) References Cited

U.S. PATENT DOCUMENTS

| | | |
|---|---|---|
| 9,992,533 B2 | 6/2018 | Lee et al. |
| 10,506,275 B1 | 12/2019 | Thielen et al. |
| 10,848,820 B2 | 11/2020 | Seo et al. |
| 2011/0078729 A1 | 3/2011 | LaJoie et al. |
| 2015/0193451 A1 | 7/2015 | Rowe |
| 2015/0256905 A1 | 9/2015 | Lee et al. |
| 2016/0248526 A1 | 8/2016 | Wang et al. |
| 2017/0013324 A1 | 1/2017 | Chen |
| 2017/0070359 A1 | 3/2017 | Kanda et al. |
| 2017/0094351 A1 | 3/2017 | Gordon |
| 2017/0127097 A1 | 5/2017 | Gordon et al. |
| 2017/0150213 A1 | 5/2017 | Cremer et al. |
| 2017/0308683 A1 | 10/2017 | Bilobrov et al. |
| 2020/0029108 A1 | 1/2020 | Dunker et al. |
| 2020/0068259 A1 | 2/2020 | Gordon |

OTHER PUBLICATIONS

U.S. Appl. No. 16/836,082 Non Final Office Action dated Mar. 17, 2021.
U.S. Appl. No. 16/836,082 Notice of Allowance dated Aug. 13, 2021.
International Searching Authority, International Search Report and Written Opinion, dated Sep. 1, 2020, issued in connection with International Application No. PCT/US2020/032118.

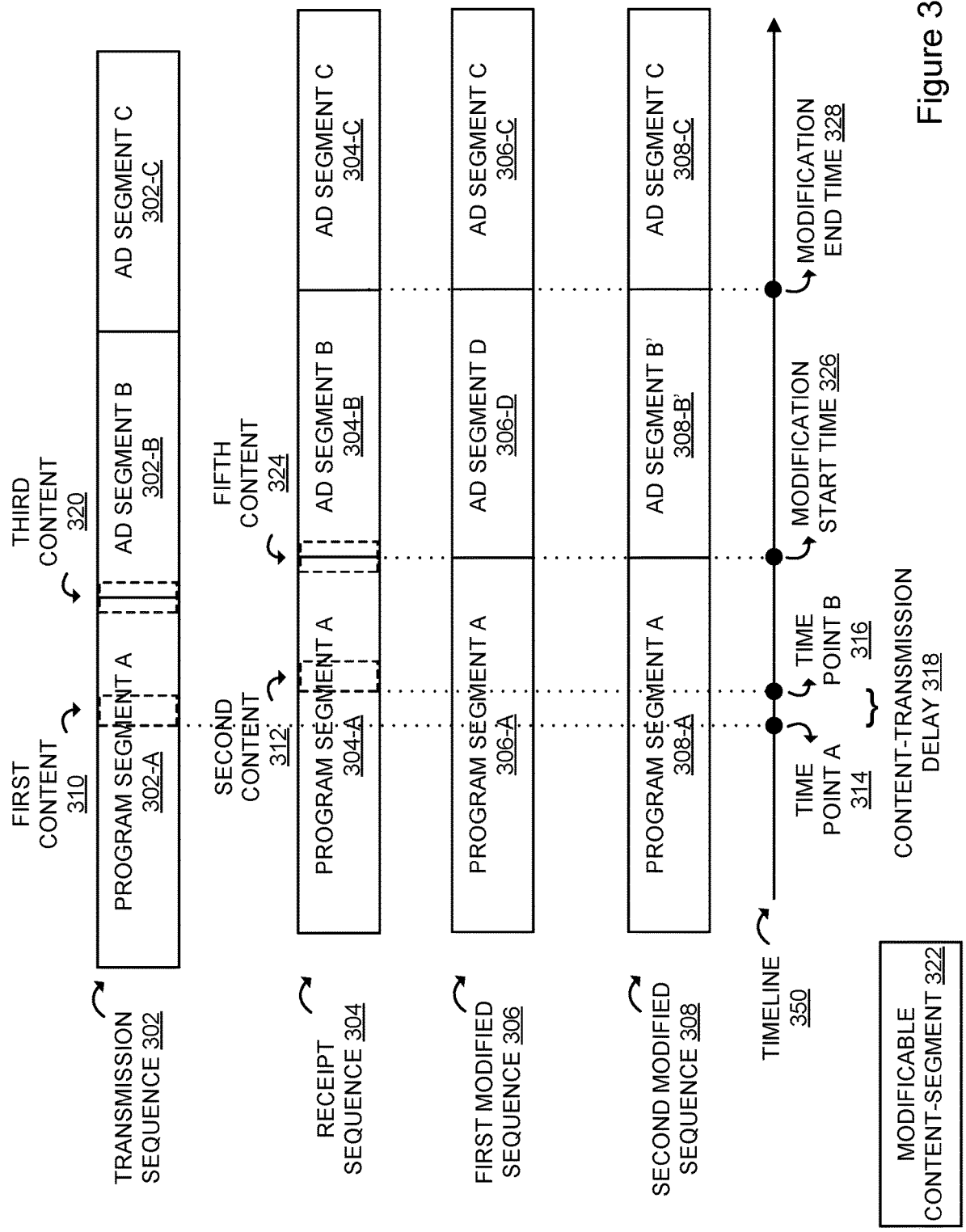

| Time Period | Content-Distribution System 102 | Content-Presentation Device 104 | Fingerprint-Matching Server 106 | Content-Management System 108 | Data-Management System 110 | Supplemental-Content Delivery System 112 |
|---|---|---|---|---|---|---|
| T1 | Transmit first content on a channel | | | | | |
| T2 | Generate first fingerprint data and first metadata | | | | | |
| T3 | Transmit first fingerprint data and first metadata | | | | | |
| T4 | | Receive second content | | | | |
| T5 | | Generate second fingerprint data and second metadata | | | | |
| T6 | | Transmit second fingerprint data and second metadata | | | | |
| T7 | | | Receive first fingerprint data and first metadata | | | |
| T8 | | | Receive second fingerprint data and second metadata | | | |

Figure 4A

| T9 | Compare first fingerprint data and second fingerprint data | | | | |
|---|---|---|---|---|---|
| T10 | Detect a match between first fingerprint data and second fingerprint data | | | | |
| T11 | Identify the channel on which the second content is being received | | | | |
| T12 | Generate metadata associated with the identified channel | | | | |
| T13 | Transmit an indication of the identified channel and the associated metadata | | | | |
| T14 | | | | Receive the indication of the identified channel and the associated metadata | |

Figure 4B

| | | | | | | | |
|---|---|---|---|---|---|---|---|
| T15 | | | | Determine historical content consumption data | | | |
| T16 | Transmit third content | | | | | | |
| T17 | Generate third fingerprint data and third metadata | | | | | | |
| T18 | Transmit third fingerprint data and third metadata | | | | | | |
| T19 | | | | | | | |
| T20 | | | | | Receive modifiable content segment Generate fourth fingerprint data and fourth metadata Transmit fourth fingerprint data and fourth metadata | | |
| T21 | | | | | | | |
| T22 | | | | | | | Receive third fingerprint data and third metadata |
| T23 | | | | | | | Receive fourth fingerprint data and fourth metadata |

Figure 4C

| | | | | | |
|---|---|---|---|---|---|
| T24 | | | Compare at least a portion of third fingerprint data and at least a portion of fourth fingerprint data | | |
| T25 | | | Detect a match between at least a portion of third fingerprint data and at least a portion of fourth fingerprint data | | |
| T26 | | | Identify an upcoming content modification opportunity on the identified channel | | |
| T27 | | | Transmit the third fingerprint data and the third metadata | | |
| T28 | | | | Receive third fingerprint data and third metadata | |
| T29 | | | | Receive fifth content | |
| T30 | | | | Output for presentation fifth content | |

Figure 4D

| | | | | | | | |
|---|---|---|---|---|---|---|---|
| T31 | Generate fifth fingerprint data and fifth metadata | | | | | | |
| T32 | Compare the third fingerprint data and the fifth fingerprint data | | | | | | |
| T33 | Detect a match between the third fingerprint data and the fifth fingerprint data | | | | | | |
| T34 | Determine modification start time and modification end time | | | | | | |
| T35 | Transmit a request for supplemental content | | | | | | |
| T36 | | | | | Receive request and select supplemental content | | |
| T37 | | | | | Transmit request for link | | |
| T38 | | | | | | | Transmit link |

Figure 4E

| T39 | T40 | T41 |
|---|---|---|
| | Receive link and retrieve supplemental content | |
| | | Perform content modification operation |
| | Transmit link | |

CONTENT-MODIFICATION SYSTEM WITH TRANSMISSION DELAY-BASED FEATURE

RELATED DISCLOSURES

This disclosure is a continuation of U.S. patent application Ser. No. 16/836,098, filed Mar. 31, 2020, which claims priority to U.S. Provisional Pat. App. No. 62/846,405, filed May 10, 2019, each of which is hereby incorporated by reference herein in its entirety.

USAGE AND TERMINOLOGY

In this disclosure, unless otherwise specified and/or unless the particular context clearly dictates otherwise, the terms "a" or "an" mean at least one, and the term "the" means the at least one.

SUMMARY

In one aspect, a method includes determining a content-transmission delay between a content-distribution system and a content-presentation device. The method also includes using at least the determined content-transmission delay as a basis to select, from among a plurality of reference fingerprint data sets, a reference fingerprint data set that corresponds with the determined content-transmission delay. The method also includes transmitting to the content-presentation device, the selected reference fingerprint data set that corresponds with the determined content-transmission delay to facilitate the content-presentation device detecting a match between query fingerprint data representing content received by the content-presentation device and at least a portion of reference fingerprint data in the transmitted reference fingerprint data set.

In another aspect, a non-transitory computer-readable storage medium has stored thereon program instructions that, upon execution by a processor, cause performance of a set of operations. The set of operations includes determining a content-transmission delay between a content-distribution system and a content-presentation device. The set of operations also includes using at least the determined content-transmission delay as a basis to select, from among a plurality of reference fingerprint data sets, a reference fingerprint data set that corresponds with the determined content-transmission delay. The set of operations also includes transmitting to the content-presentation device, the selected reference fingerprint data set that corresponds with the determined content-transmission delay to facilitate the content-presentation device detecting a match between query fingerprint data representing content received by the content-presentation device and at least a portion of reference fingerprint data in the transmitted reference fingerprint data set.

In another aspect, a computing system includes a processor and a non-transitory computer-readable storage medium, having stored thereon program instructions that, upon execution by the processor, cause performance of a set of operations. The set of operations includes determining a content-transmission delay between a content-distribution system and a content-presentation device. The set of operations also includes using at least the determined content-transmission delay as a basis to select, from among a plurality of reference fingerprint data sets, a reference fingerprint data set that corresponds with the determined content-transmission delay. The set of operations also includes transmitting to the content-presentation device, the selected reference fingerprint data set that corresponds with the determined content-transmission delay to facilitate the content-presentation device detecting a match between query fingerprint data representing content received by the content-presentation device and at least a portion of reference fingerprint data in the transmitted reference fingerprint data set.

BRIEF DESCRIPTION OF THE DRAWINGS

FIG. 3 is a diagram of example linear sequences of content and related concepts.

FIGS. 4A, 4B, 4C, 4D, 4E, and 4F collectively make up a table showing example time-periods and corresponding operations that can be performed in connection with the example content-modification system.

DETAILED DESCRIPTION

I. Overview

Figure 1:
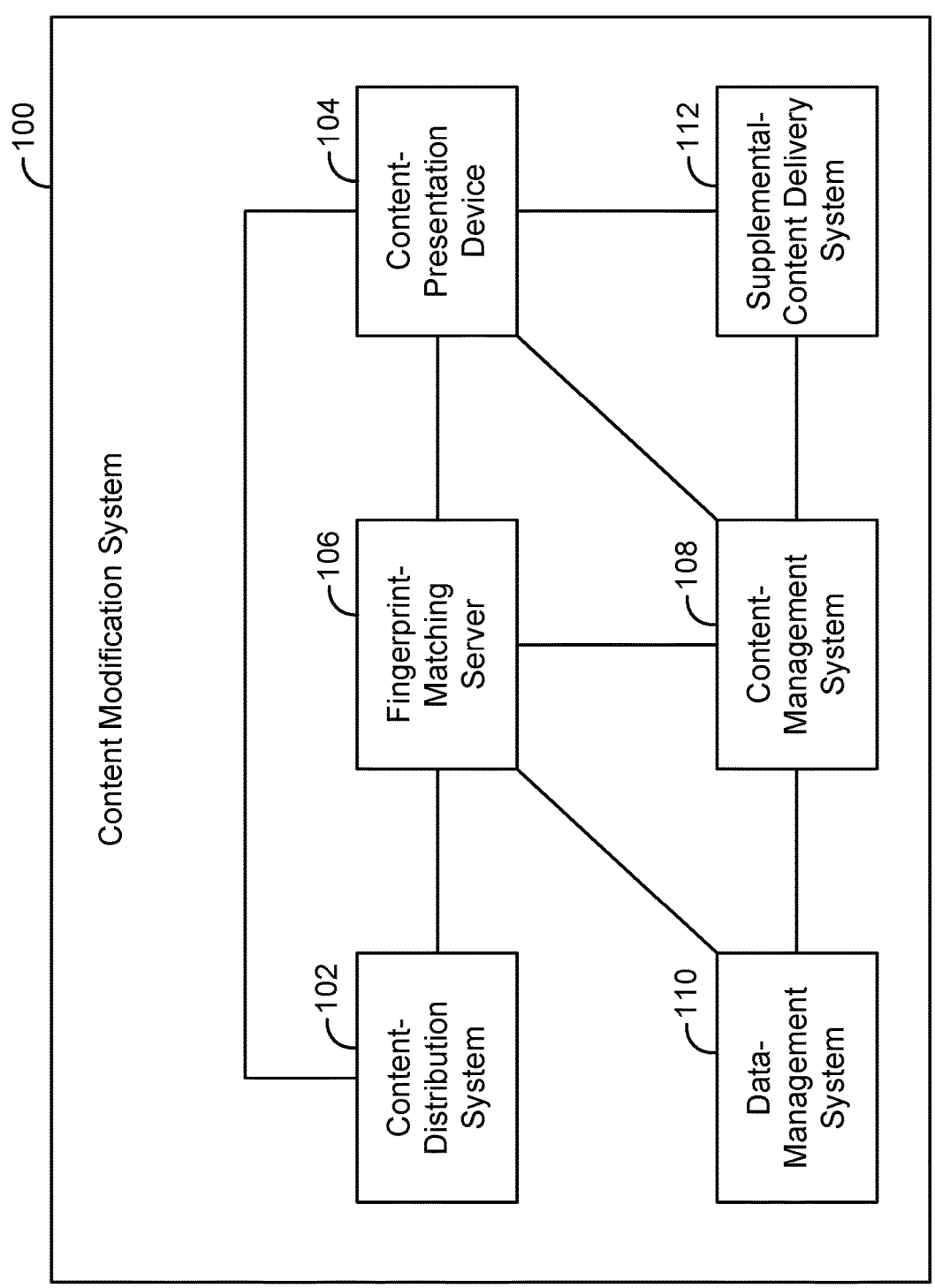
FIG. 1 is a simplified block diagram of an example content-modification system in which various described principles can be implemented.

To deliver and present content to end-users, a content provider can transmit the content to one or more content-distribution systems, each of which can in turn transmit the content to one or more respective content-presentation devices to be output for presentation to respective end-users. Such a hierarchical arrangement can facilitate convenient, widespread distribution of content.

By way of example, in order for a video content provider to deliver video content to end-users throughout the United States, the video content provider can transmit the video content by satellite or another medium to content-distribution systems that serve respective designated market areas (DMAs) within the United States. Each such content-distribution system can therefore receive the national satellite feed carrying the video content and can transmit the video content to television sets and/or set-top boxes in the content-distribution system's DMA, such that the video content can be output for presentation to respective end-users in that DMA. In practice, these content-distribution systems and their means of transmission to content-presentation devices can take various forms. For instance, a content-distribution system can be associated with a cable-television provider and can transmit video content to content-presentation devices of end-users who are cable-television subscribers through hybrid fiber/coaxial cable connections.

As such, in various scenarios, a content-distribution system can transmit content to a content-presentation device, which can receive and output the content for presentation to an end-user. In some situations, even though the content-presentation device receives content from the content-distribution system, it can be desirable for the content-presentation device to perform a content-modification operation so that the content-presentation device can output for presentation alternative content instead of at least a portion of that received content.

For example, in the case where the content-presentation device receives a linear sequence of content segments that includes a given advertisement segment positioned somewhere within the sequence, it can be desirable for the content-presentation device to replace the given advertisement segment with a different advertisement segment that is perhaps more targeted to the end-user (e.g., more targeted to the end-user's interests, demographics, etc.). As another example, it can be desirable for the content-presentation device to overlay on the given advertisement segment, overlay content that enhances the given advertisement segment in a way that is again perhaps more targeted to the end-user. The described content-modification system can facilitate providing these and other related features.

To help prepare and provide modified content for an end-user, components of the disclosed content-modification system can perform fingerprinting on content accessed at various points within the content-modification system, thereby generating fingerprint data that represents the accessed content. For example, a content-distribution system can access and fingerprint content upstream (e.g., content that the content-distribution system is or will soon transmit over a channel) and/or the content-presentation device can access and fingerprint content farther downstream (e.g., content received by the content-presentation device). The content-modification system can compare fingerprint data to detect matches between them, which can help the content-modification system identify where within a linear sequence of content segments to make a modification, such as where to place targeted content. Further, in scenarios where the channel on which the content-presentation device is receiving content is unknown, fingerprint matching can be used to identify the channel. Once the channel is identified, the content-modification system can identify an upcoming content modification opportunity within the linear sequence of content segments on the identified channel.

In practice, fingerprint matching and channel identification can be performed by a fingerprint-matching server of the disclosed content-modification system. By way of example, the fingerprint-matching server can receive, from one or more content-distribution systems, reference fingerprint data representing content being transmitted on an identified channel (e.g., a channel identified by metadata associated with the content being transmitted) and can also receive query fingerprint data representing content being received and/or output by the content-presentation device on an unidentified channel. As such, the fingerprint-matching server can compare the reference fingerprint data with query fingerprint data to determine whether there is a match. The match between the query fingerprint data and particular reference fingerprint data can enable the fingerprint-matching server to identify the channel.

However, when the fingerprint-matching server does not know the channel on which the content represented by the query fingerprint data is being received and/or output, the fingerprint-matching server might need to make comparisons to numerous (e.g., hundreds) of reference fingerprint data sets associated with numerous different channels until a match is detected and the channel is identified. This can be a time consuming process and, in some instances, can require a large amount of the fingerprint-matching server's memory and processing power to store and process the reference fingerprint data sets. Furthermore, when an end-user changes channels, especially at a high frequency, the fingerprint-matching server often needs to repeat this process for the new channel, thereby resulting in even more processing power and time delays in the fingerprint-matching server identifying new channels.

The present disclosure provides methods and systems that improve the fingerprint matching process, namely by having the content-presentation device locally perform fingerprint matching and channel identification, and by reducing the amount of reference fingerprint data sets that the content-presentation device stores and considers during the matching process. In particular, the disclosed methods and systems can involve the fingerprint-matching server determining a content-transmission delay between a content-distribution system (e.g., a television-broadcast station) and the content-presentation device and using the determined content-transmission delay as a basis for selecting, from among a plurality of reference fingerprint data sets, a particular reference fingerprint data set that corresponds to the determined content-transmission delay. The fingerprint-matching server can then transmit the selected reference fingerprint data set to the content-presentation device so that the content-presentation device can then compare the query fingerprint data with at least a portion of reference fingerprint data from the transmitted reference fingerprint data set to detect a match. And in response to detecting a match, the content-presentation device can perform an action, such as identifying the channel on which the content-presentation device is presenting or receiving the content that the query fingerprint data represents and/or another action that facilitates the content-presentation device performing a content-modification operation.

As a result of having the content-presentation device locally perform fingerprint matching and channel identification, the computational stress placed on the fingerprint-matching server can be relieved. Furthermore, by using content-transmission delay as a basis for selecting a corresponding reference fingerprint data set, the amount of reference fingerprint data sets that the fingerprint-matching server sends to the content-presentation device to store and consider in the matching process can be reduced. And reducing the amount of reference fingerprint data sets in this manner effectively reduces the number of channels the content-presentation device considers in identifying the channel on which the content-presentation device is receiving and/or outputting content. This can help minimize the amount of memory and processing power needed by the content-presentation device to store reference fingerprint data sets and identify the channel. By contrast, without being more selective about which fingerprint data sets should be sent to the content-presentation device, the content-presentation device might need to store and consider numerous (e.g., hundreds or thousands) of reference fingerprint data sets, thereby requiring a large amount of memory and processing power.

In practice, the content-transmission delay between a content-distribution system and a particular content-presentation device on one channel is often approximately the same for a majority or all of the other channels on which content is being broadcast to the content-presentation device, and so when an end-user changes channels, the new channel to which the end-user changes typically has approximately the same or the same content-transmission delay as the previous channel. As such, the new channel can be one of the number of channels represented by the reference fingerprint data sets that have been selected based on the content-transmission delay between the content-distribution system and the content-presentation device. Thus, reducing the amount of reference fingerprint data sets as described above can also reduce the amount of processing power and time needed by the content-presentation device to identify the channel in scenarios when an end-user changes the channel and/or is changing the channel at a high frequency, thereby enabling the content-modification system to more quickly identify content modification opportunities on the current channel.

II. Architecture

A. Content-Modification System

FIG. 1 is a simplified block diagram of an example content-modification system 100. The content-modification system 100 can include various components, such as a content-distribution system 102, a content-presentation device 104, a fingerprint-matching server 106, a content-management system 108, a data-management system 110, and/or a supplemental-content delivery system 112.

The content-modification system 100 can also include one or more connection mechanisms that connect various components within the content-modification system 100. For example, the content-modification system 100 can include the connection mechanisms represented by lines connecting components of the content-modification system 100, as shown in FIG. 1.

In this disclosure, the term "connection mechanism" means a mechanism that connects and facilitates communication between two or more components, devices, systems, or other entities. A connection mechanism can be or include a relatively simple mechanism, such as a cable or system bus, and/or a relatively complex mechanism, such as a packet-based communication network (e.g., the Internet). In some instances, a connection mechanism can be or include a non-tangible medium, such as in the case where the connection is at least partially wireless. In this disclosure, a connection can be a direct connection or an indirect connection, the latter being a connection that passes through and/or traverses one or more entities, such as a router, switcher, or other network device. Likewise, in this disclosure, communication (e.g., a transmission or receipt of data) can be a direct or indirect communication.

The content-modification system 100 and/or components thereof can take the form of a computing system, an example of which is described below.

Notably, in practice, the content-modification system 100 is likely to include many instances of at least some of the described components. For example, the content-modification 100 is likely to include many content-distribution systems and many content-presentation devices.

B. Computing System

Figure 2:
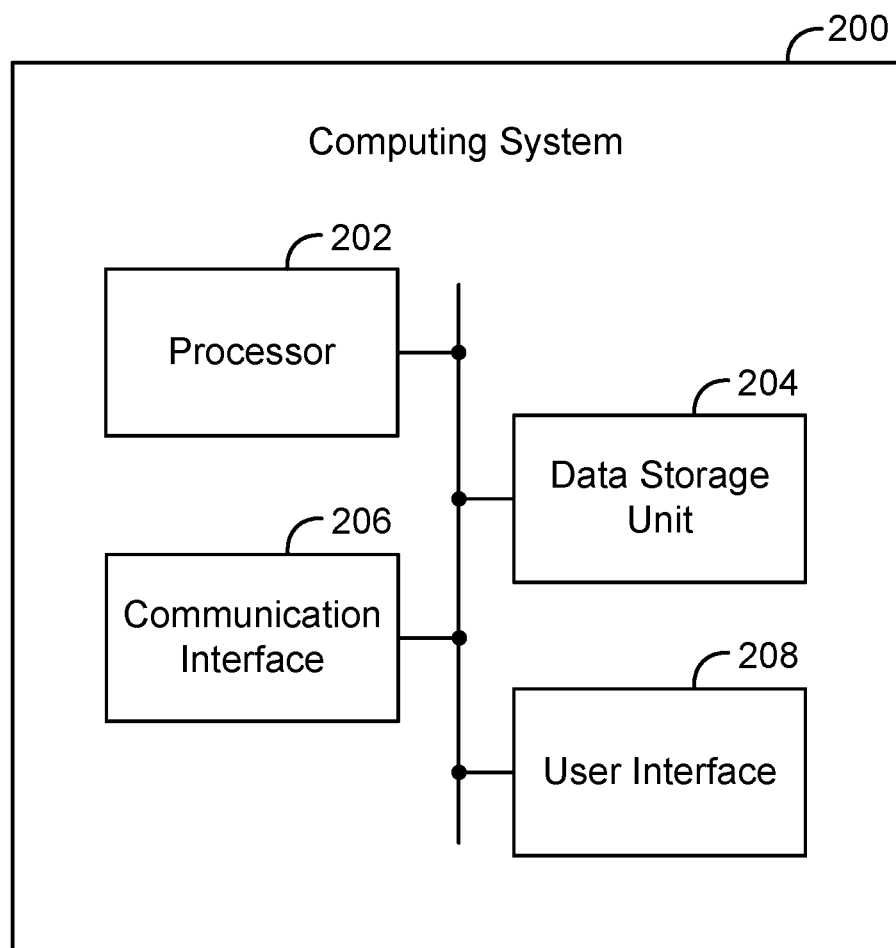
FIG. 2 is a simplified block diagram of an example computing system in which various described principles can be implemented.

FIG. 2 is a simplified block diagram of an example computing system 200. The computing system 200 can be configured to perform and/or can perform one or more operations, such as the operations described in this disclosure. The computing system 200 can include various components, such as a processor 202, a data-storage unit 204, a communication interface 206, and/or a user interface 208.

The processor 202 can be or include a general-purpose processor (e.g., a microprocessor) and/or a special-purpose processor (e.g., a digital signal processor). The processor 202 can execute program instructions included in the data-storage unit 204 as described below.

The data-storage unit 204 can be or include one or more volatile, non-volatile, removable, and/or non-removable storage components, such as magnetic, optical, and/or flash storage, and/or can be integrated in whole or in part with the processor 202. Further, the data-storage unit 204 can be or include a non-transitory computer-readable storage medium, having stored thereon program instructions (e.g., compiled or non-compiled program logic and/or machine code) that, upon execution by the processor 202, cause the computing system 200 and/or another computing system to perform one or more operations, such as the operations described in this disclosure. These program instructions can define, and/or be part of, a discrete software application.

In some instances, the computing system 200 can execute program instructions in response to receiving an input, such as an input received via the communication interface 206 and/or the user interface 208. The data-storage unit 204 can also store other data, such as any of the data described in this disclosure.

The communication interface 206 can allow the computing system 200 to connect with and/or communicate with another entity according to one or more protocols. Therefore, the computing system 200 can transmit data to, and/or receive data from, one or more other entities according to one or more protocols. In one example, the communication interface 206 can be or include a wired interface, such as an Ethernet interface or a High-Definition Multimedia Interface (HDMI). In another example, the communication interface 206 can be or include a wireless interface, such as a cellular or WI-FI interface.

The user interface 208 can allow for interaction between the computing system 200 and a user of the computing system 200. As such, the user interface 208 can be or include an input component such as a keyboard, a mouse, a remote controller, a microphone, and/or a touch-sensitive panel. The user interface 208 can also be or include an output component such as a display device (which, for example, can be combined with a touch-sensitive panel) and/or a sound speaker.

The computing system 200 can also include one or more connection mechanisms that connect various components within the computing system 200. For example, the computing system 200 can include the connection mechanisms represented by lines that connect components of the computing system 200, as shown in FIG. 2.

The computing system 200 can include one or more of the above-described components and can be configured or arranged in various ways. For example, the computing system 200 can be configured as a server and/or a client (or perhaps a cluster of servers and/or a cluster of clients) operating in one or more server-client type arrangements, for instance.

As noted above, the content-modification system 100 and/or components thereof can take the form of a computing system, such as the computing system 200. In some cases, some or all these entities can take the form of a more specific type of computing system. For instance, in the case of the content-presentation device 104, it can take the form of a desktop computer, a laptop, a tablet, a mobile phone, a television set, a set-top box, a television set with an integrated set-top box, a media dongle, or a television set with a media dongle connected to it, among other possibilities.

III. Example Operations

The content-modification system 100 and/or components thereof can be configured to perform and/or can perform one or more operations. Examples of these operations and related features will now be described.

As noted above, in practice, the content-modification system 100 is likely to include many instances of at least some of the described components. Likewise, in practice, it is likely that at least some of described operations will be performed many times (perhaps on a routine basis and/or in connection with additional instances of the described components).

A. Operations Related to the Content-Distribution System Transmitting Content and the Content-Presenting Device Receiving and Outputting Content For context, general operations and examples related to the content-distribution system 102 transmitting content and the content-presentation device 104 receiving and outputting content will now be described.

To begin, the content-distribution system 102 can transmit content (e.g., that it received from a content provider) to one or more entities such as the content-presentation device 104. Content can be or include audio content and/or video content, for example. In some examples, content can take the form of a linear sequence of content segments (e.g., program segments and advertisement segments) or a portion thereof. In the case of video content, a portion of the video content may be one or more frames, for example.

The content-distribution system 102 can transmit content on one or more channels (sometimes referred to as stations or feeds). As such, the content-distribution system 102 can be associated with a single channel content distributor or a multi-channel content distributor such as a multi-channel video program distributor (MVPD).

The content-distribution system 102 and its means of transmission of content on the channel to the content-presentation device 104 can take various forms. By way of example, the content-distribution system 102 can be or include a cable-television head-end that is associated with a cable-television provider and that transmits the content on the channel to the content-presentation device 104 through hybrid fiber/coaxial cable connections. As another example, the content-distribution system 102 can be or include a satellite-television head-end that is associated with a satellite-television provider and that transmits the content on the channel to the content-presentation device 104 through a satellite transmission. As yet another example, the content-distribution system 102 can be or include a television-broadcast station that is associated with a television-broadcast provider and that transmits the content on the channel through a terrestrial over-the-air interface to the content-presentation device 104. In these and other examples, the content-distribution system 102 can transmit the content in the form of an analog or digital broadcast stream representing the content.

The content-presentation device 104 can receive content from one or more entities, such as the content-distribution system 102. In one example, the content-presentation device 104 can select (e.g., by tuning to) a channel from among multiple available channels, perhaps based on input received via a user interface, such that the content-presentation device 104 can receive content on the selected channel.

In some examples, the content-distribution system 102 can transmit content to the content-presentation device 104, which the content-presentation device 104 can receive, and therefore the transmitted content and the received content can be the same. However, in other examples, they can be different, such as where the content-distribution system 102 transmits content to the content-presentation device 104, but the content-presentation device 104 does not receive the content and instead receives different content from a different content-distribution system.

The content-presentation device 104 can also output content for presentation. As noted above, the content-presentation device 104 can take various forms. In one example, in the case where the content-presentation device 104 is a television set (perhaps with an integrated set-top box and/or media dongle), outputting the content for presentation can involve the television set outputting the content via a user interface (e.g., a display device and/or a sound speaker), such that it can be presented to an end-user. As another example, in the case where the content-presentation device 104 is a set-top box or a media dongle, outputting the content for presentation can involve the set-top box or the media dongle outputting the content via a communication interface (e.g., an HDMI interface), such that it can be received by a television set and in turn output by the television set for presentation to an end-user.

As such, in various scenarios, the content-distribution system 102 can transmit content to the content-presentation device 104, which can receive and output the content for presentation to an end-user. In some situations, even though the content-presentation device 104 receives content from the content-distribution system 102, it can be desirable for the content-presentation device 104 to perform a content-modification operation so that the content-presentation device 104 can output for presentation alternative content instead of at least a portion of that received content.

For example, in the case where the content-presentation device 104 receives a linear sequence of content segments that includes a given advertisement segment positioned somewhere within the sequence, it can be desirable for the content-presentation device 104 to replace the given advertisement segment with a different advertisement segment that is perhaps more targeted to the end-user (i.e., more targeted to the end-user's interests, demographics, etc.). As another example, it can be desirable for the content-presentation device 104 to overlay on the given advertisement segment, overlay content that enhances the given advertisement segment in a way that is again perhaps more targeted to the end-user. The described content-modification system 100 can facilitate providing these and other related features.

As noted above, in one example, content can take the form of a linear sequence of content segments. As such, in one example, the content-distribution system 102 can transmit a linear sequence of content segments. This is referred to herein as a "transmission sequence." Likewise, the content-presentation device 104 can receive a linear sequence of content segments. This is referred to herein as a "receipt sequence." In line with the discussion above, the transmission sequence and the receipt sequence can be the same or they can be different.

FIG. 3 illustrates some examples of these concepts. In one example, the transmission sequence is the TRANSMISSION SEQUENCE 302 shown in FIG. 3. As shown, the TRANSMISSION SEQUENCE 302 includes a PROGRAM SEGMENT A 302-A, followed by an AD SEGMENT B 302-B, followed by AD SEGMENT C 302-C.

Likewise, in one example, the receipt sequence is the RECEIPT SEQUENCE 304 shown in FIG. 3. In this example, the content-distribution system 102 transmits the TRANSMISSION SEQUENCE 302 to the content-presentation device 104, which the content-presentation device 104 receives as the RECEIPT SEQUENCE 304, and therefore the TRANSMISSION SEQUENCE 302 and the RECEIPT SEQUENCE 304 are the same. As such, as shown, the RECEIPT SEQUENCE 304 also includes the PROGRAM SEGMENT A 304-A, followed by the AD SEGMENT B 304-B, followed by the AD SEGMENT C 302-C.

In FIG. 3, the transmission time of the TRANSMISSION SEQUENCE 302 and the receipt time of the RECEIPT SEQUENCE 304 are shown by way of their relationship to a TIMELINE 350. Notably, the transmission time and the receipt time are offset from each other due to a content-transmission delay, which is described in greater detail below.

As noted above, in some situations, even though the content-presentation device 104 receives content from the content-distribution system 102, it can be desirable for the content-presentation device 104 to perform a content-modification operation so that the content-presentation device 104 can output for presentation alternative content instead of at least a portion of that received content. For example, in the case where the content-presentation device 104 receives the receipt sequence, rather than outputting for presentation the receipt sequence, the content-presentation device 104 can output for presentation a modified version of the receipt sequence instead. This is referred to herein as a "modified sequence."

For example, in the case where the receipt sequence includes a given advertisement segment positioned somewhere within the receipt sequence, it can be desirable for the content-presentation device 104 to replace the given advertisement segment with a different advertisement segment that is perhaps more targeted to the end-user (i.e., more targeted to the end-user's interests, demographics, etc.), thereby resulting in a modified sequence that the content-presentation device 104 can output for presentation.

To illustrate this, in one example, the modified sequence is the FIRST MODIFIED SEQUENCE 306 shown in FIG. 3. As shown, the FIRST MODIFIED SEQUENCE 306 includes the PROGRAM SEGMENT A 306-A, followed by the AD SEGMENT D 306-D (which replaced the AD SEGMENT B 304-B), followed by AD SEGMENT C 306-C.

As another example, it can be desirable for the content-presentation device 104 to overlay, on the given advertisement segment, overlay content that enhances the given advertisement segment in a way that is again perhaps more targeted to the end-user, thereby resulting in a modified sequence that the content-presentation device 104 can output for presentation.

To illustrate this, in another example, the modified sequence is the SECOND MODIFIED SEQUENCE 308 shown in FIG. 3. As shown, the SECOND MODIFIED SEQUENCE 308 includes the PROGRAM SEGMENT A 308-A, followed by the AD SEGMENT B' 308-B' (which is the AD SEGMENT B 304-B modified with overlay content), followed by AD SEGMENT C 308-C.

Other portions of FIG. 3 will be described later in this disclosure as related concepts are introduced and described.

Moving on in view of the context provided above, FIGS. 4A, 4B, 4C, 4D, 4E, and 4F, collectively make up a table showing example time-periods and corresponding operations that can be performed in connection with the content-modification system 100. These and other related operations will now be described.

B. Operations Related to the Content-Distribution System Transmitting First Content on a Channel During a time-period T1, the content-distribution system 102 can transmit content on a channel to the content-presentation device 104. This content is referred to herein as "first content." In one example, the first content is the FIRST CONTENT 310 shown in FIG. 3.

During a time-period T2, the content-distribution system 102 can generate fingerprint data representing the first content. This fingerprint data is referred to herein as "first fingerprint data." The content-distribution system 102 can generate the first fingerprint data using any content fingerprinting process now known or later developed. An example fingerprint generation technique is described in U.S. Pat. No. 9,495,451 issued Nov. 15, 2016, the entirety of which is hereby incorporated by reference herein. The content-distribution system 102 can generate first fingerprint data at a given rate, such as at the rate of one fingerprint per frame of the first content. The first fingerprint data can be or include some or all of these generated fingerprints.

The content-distribution system 102 can access the first content at various points within the content-distribution system 102. As one example, the content-distribution system 102 can access the first content after it is output by a distribution amplifier within the content-distribution system 102.

Also during the time-period T2, the content-distribution system 102 can generate metadata associated with the first content and/or the first fingerprint data. This metadata is referred to herein as "first metadata." In one example, the first metadata can be or include a transmission time-stamp, which represents a time-point at which the content-distribution system 102 transmitted the first content. The content-distribution system 102 can determine the transmission time-stamp in various ways, such as based on a time clock that is synchronized to a reference clock.

As another example, the first metadata can be or include a channel identifier, which identifies the channel on which the content-distribution system 102 is transmitting the first content. The content-distribution system 102 can determine the channel identifier in various ways such as based on mapping data that maps the content-distribution system 102 and/or physical inputs and/or outputs within the content-distribution system 102 to respective channel identifiers. In one example, in the case where the content-distribution system 102 transmits content A on channel A, content B on channel B, and content C on channel C, the mapping data can specify which of three different outputs (perhaps on three different distribution amplifiers) maps to which channel identifier, such that the content-distribution system 102 can determine the appropriate channel identifier for content of a given channel.

As another example, the first metadata can be or include SCTE-104 data, a watermark, or a similar type of metadata, any of which can themselves encode other metadata, such as a program identifier, an advertisement identifier (e.g., an industry standard coding identification (ISCI) key), a program genre, or another type of textual or numeric metadata, for instance.

The content-distribution system 102 can associate the first fingerprint data with the first metadata in various ways. For instance, in the case where the first fingerprint data includes multiple fingerprints with each fingerprint representing a corresponding frame of the first content, the content-distribution system 102 can associate each fingerprint with a corresponding transmission time-stamp and/or with other corresponding first metadata.

During a time-period T3, the content-distribution system 102 can transmit the first fingerprint data and the first metadata to the fingerprint-matching server 106. The content-distribution system 102 can transmit the first fingerprint data and the first metadata at a given interval. For example, every two seconds, the content-distribution system 102 can transmit the first fingerprint data and the first metadata that it generated during that most recent two-second time-period.

C. Operations Related to the Content-Presentation Device Receiving Second Content During a time-period T4, the content-presentation device 104 can receive content from the content-distribution system 102. This content is referred to herein as "second content." In one example, the second content is the SECOND CONTENT 312 shown in FIG. 3.

During a time-period T5, the content-presentation device 104 can generate fingerprint data representing the second content. This fingerprint data is referred to herein as "second fingerprint data." The content-presentation device 104 can generate the second fingerprint data using any content fingerprinting process now known or later developed. The content-presentation device 104 can generate the second fingerprint data at various rates, such as at the rate of one fingerprint per frame of the second content. The second fingerprint data can be or include some or all of these generated fingerprints.

The content-presentation device 104 can access the second content at various points within the content-presentation device 104. As one example, the content-presentation device 104 can access the second content as it is being received by an input buffer (e.g., an HDMI buffer) of the content-presentation device 104. In another configuration, the content-presentation device 104 can access the second content as it is being received by a display buffer of the content-presentation device 104. In this configuration, the second content can therefore be content that the content-presentation device 104 not only receives, but also outputs for presentation.

Also during the time-period T5, the content-presentation device 104 can generate metadata associated with the second content and/or the second fingerprint data. This metadata is referred to herein as "second metadata." As one example, the second metadata can be or include a receipt time-stamp, which represents a time-point at which the content-presentation device 104 received the second content. The content-presentation device 104 can determine the receipt time-stamp in various ways, such as based on a time clock that is synchronized to a reference clock. As noted above, the content-presentation device 104 can access the second content at various points within the content-presentation device 104. In one example, the point at which the second content is accessed can be considered the "receipt" point for purposes of determining the receipt time-stamp.

In practice, while the first metadata is likely to be or include a channel identifier, the second metadata is likely to not be nor include a channel identifier.

The content-presentation device 104 can associate the second fingerprint data with the second metadata in various ways. For instance, where the second fingerprint data includes multiple fingerprints with each fingerprint representing a corresponding frame of second content, the content-presentation device 104 can associate each second fingerprint with a corresponding receipt time-stamp and/or other corresponding metadata.

During a time-period T6, the content-presentation device 104 can transmit the second fingerprint data and the second metadata to the fingerprint-matching server 106. The content-presentation device 104 can transmit the second fingerprint data and the second metadata at a given interval. For example, every two seconds, the content-presentation device 104 can transmit the second fingerprint data and the second metadata that it generated during that most recent two-second time-period.

D. Operations Related to Identifying a Channel on Which the Content-Presentation Device is Receiving the Second Content During a time-period T7, the fingerprint-matching server 106 can receive the first fingerprint data and the first metadata from the content-distribution system 102. As noted above, the first fingerprint data represents the first content transmitted by the content-distribution system 102 on the channel. As noted above, the first metadata can, and for the purposes of this described example does, identify the channel. In this way, the first content can be considered as content being transmitted on an identified channel.

During a time-period T8, the fingerprint-matching server 106 can receive the second fingerprint data and the second metadata from the content-presentation device 104. As noted above, the second fingerprint data represents the second content received by the content-presentation device 104. However, as noted above, the associated metadata may not, and for the purposes of this described example does not, identify the channel. In this way, the second content can be considered as content being received on an unidentified channel.

During a time-period T9, the fingerprint-matching server 106 can compare the first fingerprint data and the second fingerprint data to determine whether there is a match. In this disclosure, this type of match attempt, namely a match attempt between (i) reference fingerprint data representing content being transmitted on an identified channel and (ii) query fingerprint data representing content being received on an unidentified channel, is referred to herein as a "cold match attempt."

During a time-period T10, based on the comparing, the fingerprint-matching server 106 can detect a match between the first fingerprint data and the second fingerprint data. The fingerprint-matching server 106 can compare and/or detect a match between fingerprint data using any content fingerprint comparing and matching technique now known or later developed. An example fingerprint comparing and matching technique is described in U.S. Pat. No. 9,146,990 issued Sep. 29, 2015, the entirety of which is hereby incorporated by reference herein.

To effectively compare the first fingerprint data and the second fingerprint data, the fingerprint-matching server 106 may need to account for a content-transmission delay. For context, in the case where the content-distribution system 102 transmits a given frame of content on a given channel at a time-point A, for various reasons, the content-presentation device 104 may not receive that frame until a time-point B that is later (e.g., ten seconds later) than the time-point A. This type of delay is referred to herein as a "content-transmission delay."

In one example, the time-point A, the time-point B, and the content-transmission delay can be the TIME-POINT A 314, the TIME-POINT B 316, and the CONTENT-TRANSMISSION DELAY 318, respectively, shown FIG. 3. Note that FIG. 3 is for illustration purposes and is not necessarily to scale at least with respect to time. In practice, the actual amount of content-transmission delay may be different from the amount shown.

To help the fingerprint-matching server 106 effectively compare the first fingerprint data with the second fingerprint data, the fingerprint-matching server 106 may need to account for such a content-transmission delay. In one example, the fingerprint-matching server 106 can do this by comparing the first fingerprint data that it receives at a receipt time-point with the second fingerprint data that it receives during a time-period defined by a starting time-point and an ending time-point. The starting time-point can be the receipt time-point plus an offset representing an anticipated content-transmission delay (e.g., ten seconds), minus a tolerance a time-period (e.g., two seconds). The ending time-point can be the receipt time-point plus the offset (e.g., ten seconds), plus the tolerance a time-period (e.g., two seconds). As such, in one example where the anticipated content-transmission delay is 10 seconds, the fingerprint-matching server 106 can compare first fingerprint data that it receives at a receipt time-point with second fingerprint data that it receives during a time-period between (i) the receipt time-point plus eight seconds and (ii) receipt time-point plus twelve seconds.

In some cases, the fingerprint-matching server 106 can determine a content-transmission delay, which it can use to select an appropriate offset for use in determining the starting and ending time-points, as described above. The fingerprint-matching server 106 can determine the content-transmission delay in various ways. For example, after the fingerprint-matching server 106 detects a match based on a cold match attempt, the fingerprint-matching server 106 can determine the content-transmission delay as a difference between the corresponding transmission time-stamp (of the first metadata) and the corresponding receipt time-stamp (of the second metadata), for example. Notably, the content-transmission delay can vary from channel to channel.

During a time-period T11, based on the detected match, the fingerprint-matching server 106 can identify the channel on which the second content is being received by the content-presentation device 104. In one example, the fingerprint-matching server 106 can identify the channel based on the channel identifier metadata associated with the first fingerprint data used to detect the match.

Notably, in practice, since there are likely to be multiple potential channels on which the content-presentation device 104 is receiving the second content, the fingerprint-matching server 106 is likely to compare the second fingerprint data with multiple instances of first fingerprint data (each representing a different respective instance of first content on a different respective channel), to determine which of those multiple instances matches the second fingerprint data.

Also, in some cases, the fingerprint-matching server 106 can detect a match between the second fingerprint data and each of multiple instances of first fingerprint data (each representing a different respective instance of first content on a different respective channel). This is referred to herein as a "multimatch scenario" and can occur for various reasons. For example, this can occur when the content-distribution system 102 is transmitting the same or similar content on more than one channel at or about the same time. In this scenario, the fingerprint-matching server 106 can perform additional operations to identity, from among the multiple channels associated with the multimatch scenario, on which specific channel the content-presentation device 104 is receiving the second content. The fingerprint-matching server 106 can do this using any channel multimatch disambiguation technique now known or later developed. An example channel multimatch disambiguation technique is described in U.S. Pat. No. 9,992,533 issued Jun. 5, 2018, the entirety of which is hereby incorporated by reference herein.

E. Operations Related to Determining Historical Content Consumption Data

During a time-period T12, the fingerprint-matching server 106 can generate metadata associated with the identified channel. For example, the metadata can be or include a channel identification time-stamp. The fingerprint-matching server 106 can determine the channel identification time-stamp in various ways, such as based on a time clock that is synchronized to a reference clock. In another example, the metadata can be or include a device identifier that identifies the content-presentation device 104 that is receiving content on the identified channel. The fingerprint-matching server 106 can determine the device identifier in various ways, such as by receiving it from the content-presentation device 104. In another example, the fingerprint-matching server 106 can receive data (e.g., device registration data) from the content-presentation device 104 and can use mapping data to map the received data to determine the device identifier.

During a time-period T13, the fingerprint-matching server 106 can transmit an indication of the identified channel and the associated metadata to the data-management system 110.

During a time-period T14, the data-management system 110 can receive the indication of the identified channel and the associated metadata from the fingerprint-matching server 106.

The data-management system 110 can use the received indication of the identified channel and the associated metadata, perhaps with other data, to determine when the content-presentation device 104 has received content on the identified channel, what specific content the content-presentation device 104 has received, etc. This type of data is referred to herein as "historical content consumption data."

As such, during a time-period T15, the data-management system 110 can determine historical content consumption data associated with the content-presentation device 104.

F. Operations Related to the Content-Distribution System Transmitting Third Content As noted above, the fingerprint-matching server 106 can identify the channel on which the content-presentation device 104 is receiving the second content.

During a time-period T16, the content-distribution system 102 can transmit content on the identified channel to the content-presentation device 104. This content is referred to herein as "third content." In one example, the third content is the THIRD CONTENT 320 shown in FIG. 3. In practice, the content-distribution system 102 is likely to transmit the third content shortly after (e.g., immediately after or a few seconds or minutes after) transmitting the first content.

During a time-period T17, the content-distribution system 102 can generate fingerprint data representing the third content. This fingerprint data is referred to herein as "third fingerprint data."

Also during the time-period T17, the content-distribution system 102 can generate metadata associated with the third content and/or the third fingerprint data. This metadata is referred to herein as "third metadata." The content-distribution system 102 can also associate the third fingerprint data with the third metadata.

During a time-period T18, the content-distribution system 102 can transmit the third fingerprint data and the third metadata to the fingerprint-matching server 106.

The content-distribution system 102 can transmit the third content, generate the third fingerprint data, generate the third metadata, associate the third fingerprint data with the third metadata, and transmit the third fingerprint data and the third metadata in various ways, such as ways that are the same as or similar to those described above in connection with transmitting the first content, generating the first fingerprint data, generating the first metadata, associating the first fingerprint data with the first metadata, and transmitting the first fingerprint data and the first metadata.

G. Operations Related to the Content-Management System Receiving a Modifiable Content-Segment During a time-period T19, the content-management system 108 can receive content in the form of a content segment that has been identified as a candidate to be modified. This content is referred to herein as a "modifiable content-segment" or "fourth content." In one example, the modifiable content-segment is the MODIFIABLE CONTENT-SEGMENT 322 shown in FIG. 3.

The modifiable content-segment can take various forms. For example, the modifiable content-segment can be an advertisement segment (e.g., a commercial) or a program segment. As such, in one example, the modifiable content-segment can be an advertisement segment that has been identified as a candidate to be modified, perhaps by way of being replaced with a different advertisement segment, and/or by way of having content overlaid thereon.

In one example, a user, perhaps associated with the content-distribution system 102, can facilitate uploading the modifiable content-segment to the content-management system 108, such that the content-management system 108 can receive it in this way.

During a time-period T20, the content-management system 108 can generate fingerprint data representing the modifiable content-segment. This fingerprint data is referred to herein as "fourth fingerprint data." The content-management system 108 can generate the fourth fingerprint data using any fingerprint generation technique now known or later developed. The content-management system 108 can generate the fourth fingerprint data at a given rate, such as at the rate of one fingerprint per frame of the fourth content. The fourth fingerprint data can be or include some or all of these generated fingerprints.

Also during the time-period T20, the content-management system 108 can generate metadata associated with the modifiable content-segment and/or the fourth fingerprint data. This metadata is referred to herein as "fourth metadata." As one example, the fourth metadata can be or include a duration of the modifiable content-segment. The content-management system 108 can determine the duration in various ways, such as based on the fingerprint generation process. For example, in the case where the content-management system 108 generating the fourth fingerprint data involves generating one fingerprint per frame, where the modifiable content-segment has a frame rate of 30 frames per second, and where the fingerprinting process results in 300 fingerprints being generated, the content-management system 108 can deduce that the modifiable content-segment has a duration of ten seconds. The metadata can also be or include other information about the modifiable content-segment, such as a content segment identifier, a title, and/or specifics about permissible ways in which the modifiable content-segment can be modified, etc.

During a time-period T21, the content-management system 108 can transmit the fourth fingerprint data and the fourth metadata to the fingerprint-matching server 106.

In practice, the content-management system 108 is likely to receive many modifiable content-segments. In such situations, the content-management system 108 can perform one or more of the operations described above, as appropriate for each of the many received modifiable content-segments. As such, the content-management system 108 can transmit many instances of fourth fingerprint data, each corresponding with a different respective modifiable content-segment, to the fingerprint-matching server 106.

H. Operations Related to the Fingerprint-Matching Server Identifying an Upcoming Content Modification Opportunity on the Identified Channel During a time-period T22, the fingerprint-matching server 106 can receive the third fingerprint data and the third metadata from the content-distribution system 102. As noted above, the third fingerprint data represents the third content transmitted by the content-distribution system 102 on the identified channel.

During a time-period T23, the fingerprint-matching server 106 can receive the fourth fingerprint data and the fourth metadata from the content-management system 108. As noted above, the fourth fingerprint data represents the modifiable content-segment.

During a time-period T24, the fingerprint-matching server 106 can compare at least a portion of the third fingerprint data with at least a portion of the fourth fingerprint data to determine whether there is a match.

During a time-period T25, based on the comparing, the fingerprint-matching server 106 can detect a match between the at least a portion of the third fingerprint data and the at least a portion of the fourth fingerprint data. The fingerprint-matching server 106 can compare and/or detect a match between fingerprint data using any content fingerprint comparing and matching process now known or later developed.

During a time-period T26, based on the detected match, the fingerprint-matching server 106 can determine that at least a portion of the modifiable content-segment is included within the third content, and therefore can identify an upcoming content modification opportunity on the identified channel. For example, the fingerprint-matching server 106 can determine that at least a beginning portion of the MODIFIABLE CONTENT-SEGMENT 322 is included within the THIRD CONTENT 320, as shown in FIG. 3, and therefore can identify an upcoming content modification opportunity.

As noted above, the fingerprint-matching server 106 can generate third metadata, which can be the same as or similar to the first metadata. As such, the third metadata can be or include a transmission time-stamp and/or a channel identifier, for example. However, the third metadata can also be or include a position of at least a portion of the modifiable content-segment within the third content. In one example, the metadata can specify this using a starting frame marker and an ending frame marker, each corresponding with a respective frame of the third content. The fingerprint-matching server 106 can determine the starting frame marker and the ending frame marker based on the matching.

Notably, in practice, since there are likely to be multiple potential modifiable content-segments where portions thereof could be included within the third content, the fingerprint-matching server 106 is likely to compare at least a portion of the third fingerprint data with at least a portion of multiple instances of fourth fingerprint data (each representing a different respective instance of a modifiable content-segment), to determine which of those multiple instances of the fourth fingerprint data has a portion that matches the at least a portion of the third fingerprint data.

I. Operations Related to Preparing the Content-Presentation Device to Perform a Content-Modification Operation in Connection with the Identified Upcoming Content Modification Opportunity During a time-period T27, based on the detected match, the fingerprint-matching server 106 can transmit the third fingerprint data and the third metadata to the content-presentation device 104 data to facilitate preparing the content-presentation device 104 to perform a content-modification operation in connection with the identified upcoming content modification opportunity.

During a time-period T28, the content-presentation device 104 can receive the third fingerprint data and the third metadata from the fingerprint-matching server 106.

During a time-period T29, the content-presentation device 104 can receive content on the identified channel. This content is referred to herein as "fifth content." In one example, the fifth content is the FIFTH CONTENT 324 shown in FIG. 3.

For various reasons (e.g., due to a transmission delay associated with transmitting fingerprint data and metadata being shorter that the content-transmission delay), the content-presentation device 104 can receive the third fingerprint data and the third metadata from the fingerprint-matching server 106 before receiving the fifth content from the content-distribution system 102. In this way, the content-presentation device 104 can receive fingerprint data representing content that the content-presentation device 104 is expecting to receive shortly thereafter, and that the content-presentation device should actually receive shortly thereafter unless an interruption event (e.g., a channel-change event) occurs.

In practice, similar to how the content-distribution system 102 is likely to transmit the third content shortly after (e.g., immediately after or a few seconds or minutes after) transmitting the first content, the content-presentation device 104 is likely to receive the fifth content shortly after (e.g., immediately after or a few seconds or minutes after) receiving the second content.

During a time-period T30, the content-presentation device 104 can output for presentation at least a portion of the fifth content. For example, referring to FIG. 3, the content-presentation device can output for presentation the portion of the FIFTH CONTENT 324 that is the end portion of the PROGRAM SEGMENT A 304-A.

As noted above, in some situations, even though the content-presentation device 104 receives content from the content-distribution system 102, it can be desirable for the content-presentation device 104 to perform a content-modification operation so that the content-presentation device 104 can output for presentation alternative content instead of at least a portion of the received content.

As such, even though the content-presentation device 104 receives the fifth content and outputs for presentation at least a portion of the fifth content, it can be desirable for the content-presentation device 104 to perform a content-modification operation so that the content-presentation device 104 can also output for presentation alternative content instead of at least another portion (e.g., the remaining portion) of the fifth content. For example, referring to FIG. 3, it can be desirable for the content-presentation 104 device to replace at least a portion of the AD SEGMENT B 304-B with at least a portion of a different advertisement segment that is perhaps more targeted to the end-user. As another example, it can be desirable for the content-presentation device 104 to overlay on at least a portion of the AD SEGMENT B 304-B, overlay content that enhances at least a portion of the AD SEGMENT B 304-B in a way that is again perhaps more targeted to the end-user.

During a time-period T31, the content-presentation device 104 can generate fingerprint data representing the fifth content. This fingerprint data is referred to herein as "fifth fingerprint data." The content-distribution system 102 can generate the fifth fingerprint data using any content fingerprinting process now known or later developed. The content-presentation device 104 can generate the fifth fingerprint data at various rates, such as at the rate of one fingerprint per frame of the fifth content. The fifth fingerprint data can be or include some or all of these generated fingerprints.

Also during the time-period T31, the content-presentation device 104 can generate metadata associated with the fifth content and/or the fifth fingerprint data. This metadata is referred to herein as "fifth metadata."

The content-presentation device 104 can receive the fifth content, generate the fifth fingerprint data, generate the fifth metadata, associate the fifth fingerprint data with the fifth metadata in various ways, such as ways that are the same as or similar to those described above in connection with receiving the second content, generating the second fingerprint data, generating the second metadata, and associating the second fingerprint data with the second metadata.

As noted above, the content-presentation device 104 can receive the third fingerprint data from the fingerprint-matching server 106 and can generate the fifth fingerprint data.

During a time-period T32, the content-presentation device 104 can compare the third fingerprint data and the fifth fingerprint data to determine whether there is a match.

During a time-period T33, based on the comparing, the content-presentation device 104 can detect a match between the third fingerprint data and the fifth fingerprint data. In this disclosure, this type of match attempt, namely a match attempt between (i) reference fingerprint data representing content transmitted by the content-distribution system 102 on an identified channel (at least based on the most recent channel identification analysis), and (ii) query fingerprint data representing content being received by the content-presentation device 104 on the same identified channel, is referred to herein as a "hot match attempt." The fingerprint-matching server 106 can compare and/or detect a match between fingerprint data using any content fingerprint comparing and matching process now known or later developed.

During a time-period T34, based on the detected match, the content-presentation device 104 can determine a time-point at which the identified upcoming modification opportunity starts. This is referred to herein as the "modification start-time." In one example, the modification start-time is the MODIFICATION START-TIME 326 as shown FIG. 3.

In one example, the content-presentation device 104 can determine the modification start-time by starting with the transmission time-stamp associated with the starting frame marker (which, as described above, can be or be included in the third metadata) and adding the content-transmission delay to that transmission time-stamp, to arrive at the modification start-time.

As another example, the content-presentation device 104 can determine the modification start-time by first establishing a synchronous lock between the third content, the third fingerprint data, and/or the third metadata on the one hand, and the fifth content, the third fifth fingerprint data, and/or the fifth metadata, on the other hand. The content-presentation device 104 can establish the synchronous lock using any synchronous lock technique now known or later developed. An example synchronous lock technique is described in U.S. Pat. No. 10,506,275 issued Dec. 10, 2019, the entirety of which is hereby incorporated by reference herein. Another example synchronous lock technique is described in U.S. Pat. App. Pub. No. 2020/0029108 published Jan. 23, 2020, the entirety of which is hereby incorporated by reference herein.

The content-presentation device 104 can then determine the modification start-time by determining a time-period between (i) a current receipt time-stamp associated with a first portion of the fifth content that the content-presentation device 104 is currently receiving and (ii) based on the synchronous lock, an anticipated receipt time-stamp associated with a second portion of the fifth content that is the start of the modifiable content-segment, and then adding the determined time-period to the current receipt time-stamp, to arrive at the modification start-time.

Also during the time-period T34, based on the detected match, the content-presentation device 104 can determine a time-point at which the identified upcoming modification opportunity ends. This is referred to herein as the "modification end-time." In one example, the modification end-time is the MODIFICATION END-TIME 328 as shown FIG. 3.

In one example, the content-presentation device 104 can determine the modification end-time by starting with the modification start-time and adding the duration of the modifiable content-segment (which, as described above, can be or be included in the fourth metadata) to the modification start-time, to arrive at the modification end-time.

Notably, if the content-presentation device 104 performs a hot match attempt and does not detect a match, the content-presentation device 104 can determine that the content-presentation device 104 is no longer receiving content on the most recently identified channel. In response, the content-presentation device 104 can repeat one or more of the operations described above so that the fingerprint-matching server 106 can perform another cold match attempt, to attempt to identify the channel again.

During a time-period T35, the content-presentation device 104 can transmit a request for content for use in connection with performing the content-modification operation, to the content-management system 108. This content is referred to herein as "supplemental content." In one example, the content-presentation device 104 can transmit the request before the modification start-time (e.g., ten seconds before). In some cases, the request can include selection criteria for the supplemental content, which the content-presentation device 104 can determine based on the third metadata that the content-presentation device 104 receives from the fingerprint-matching server 106, for instance.

For example, the selection criteria can specify a requested type of content (e.g., a replacement content segment or overlay content), duration (e.g., 15 seconds, 30 seconds, or 60 seconds), aspect ratio (e.g., 4:3 or 16:9), and/or resolution (e.g., 720p or 1080p).

During a time-period T36, the content-management system 108 can receive the request and use it as a basis to select supplemental content from among multiple supplemental content items that are available for selection. In some cases, the content-management system 108 can receive and consider various data to help inform which supplemental content to select. For example, the content-management system 108 can receive historical content consumption data for the content-presentation device 104 from the data-management system 110 and/or the content-management system 108 can receive demographic data from a demographic data provider. The content-management system 108 can then use at least the received historical content consumption data and/or the received demographic data as a basis to select the supplemental content.

The content-management system 108 can cause the selected supplemental content to be transmitted to the content-presentation device 104. In one example, the content-management system 108 can do this by communicating with a supplemental-content delivery system 112 that can host the supplemental content. The supplemental-content delivery system 112 can take various forms and can include various components, such as a content distribution network (CDN).

During a time-period T37, the content-management system 108 can transmit a request for a link (e.g., a Uniform Resource Identifier (URI) or a Uniform Resource Locator (URL)) pointing to the hosted supplemental content, to the supplemental-content delivery system 112.

During a time-period T38, the supplemental-content delivery system 112 can receive and respond to the request for the link by transmitting the requested link to the content-management system 108.

During a time-period T39, the content-management system 108 can then in turn transmit the link to the content-presentation device 104.

During a time-period T40, the content-presentation device 104 can receive the link, which it can use to retrieve the supplemental content from the supplemental-content delivery system 112, such that the content-presentation device 104 can use the retrieved supplemental content in connection with performing the content-modification operation. In one example, the content-presentation device 104 can retrieve the supplemental content and store the supplemental content in a data-storage unit of the content-presentation device 104.

As such, in some examples, the content-presentation device 104 can receive the modifiable content-segment from one source (e.g., the content-distribution system 102), and the supplemental content from another source (e.g., the supplemental-content delivery system 112). These segments can be transmitted to, and received by, the content-presentation device 104 in different ways. For example, the content-distribution system 102 can transmit, and the content-presentation device 104 can receive, the modifiable content-segment as a broadcast stream transmission, whereas the supplemental-content delivery system 112 can transmit, and the content-presentation device 104 can receive, the supplemental content as an over-the-top (OTT) transmission. In this context, in one example, the content-distribution system 102 can receive the modifiable content-segment via one communication interface (e.g., an HDMI interface), and the content-presentation device 104 can receive the supplemental content via a different communication interface (e.g., an Ethernet or WI-FI interface).

J. Operations Related to the Content-Presentation Device Performing a Content-Modification Operation At a time-period T41, the content-presentation device 104 can perform the content-modification operation. The content-presentation device 104 can do this in various ways, perhaps depending on the type of content-modification operation to be performed.

In one example, the content-presentation device 104 performing a content-modification operation can involve the content-presentation device 104 modifying the modifiable content-segment by replacing it with supplemental content. This is referred to herein as a "content-replacement operation." For example, in this scenario, the content-presentation device 104 can receive a linear sequence of content segments that includes the modifiable content-segment and the associated metadata, and can also receive the supplemental content segment, as described above. The content-presentation device 104 can output for presentation the sequence of content segments up until the modification start-time (which corresponds to the start of the modifiable content-segment), at which time the content-presentation device 104 can switch to outputting for presentation the supplemental content instead. Then, at the modification end-time (which corresponds to the end of the modifiable content-segment), the content-presentation device 104 can switch back to outputting for presentation the content that follows in the linear sequence of content segments (or perhaps to other content, such as additional supplemental content that is replacing another modifiable content-segment).

In one example, the operation of the content-presentation device 104 switching from outputting the sequence of content segments to outputting the supplemental content can involve using various buffers of the content-presentation device 104. For example, this can involve the content-presentation device 104 switching from using first data in a first input buffer where the sequence of content segments is being received to using second data in a second input buffer where the supplemental content is being received, to populate a display buffer.

As such, according to one example as illustrated in FIG. 3, by performing a content replacement operation, the content-presentation device 104 can replace the AD SEGMENT B 302-B with the AD SEGMENT B 304-B. As a result, rather than outputting for presentation the RECEIPT SEQUENCE 304, the content-presentation device can instead output for presentation the FIRST MODIFIED SEQUENCE 306.

In another example, the content-presentation device 104 performing a content-modification operation can involve the content-presentation device 104 modifying a modifiable content-segment by overlaying on the modifiable content-segment, overlay content (referred to herein as a "content-overlay operation"). For example, in this scenario, the content-presentation device 104 can again receive a linear sequence of content segments that includes the modifiable content-segment and the associated metadata, and the content-presentation device 104 can also receive the supplemental content, as described above.

The content-presentation device 104 can then output for presentation the modifiable content-segment as it ordinarily would, except that starting at the modification start-time, the content-presentation device 104 can start overlaying the supplemental content on the modifiable content-segment. The content-presentation device 104 can continue overlaying the supplemental content until the modification end-time. In this way, the content-presentation device 104 can overlay the supplemental content during at least some temporal portion of the modifiable content-segment.

In one example, the operation of the content-presentation device 104 overlaying supplemental content on the modifiable content-segment can involve using various buffers of the content-presentation device 104. For example, this can involve the content-presentation device 104 using a portion of first data in a first input buffer where the sequence of content segments is being received together with second data in a second input buffer where the supplemental content is being received, for the purposes of populating a display buffer. In this way, the content-presentation device can combine relevant portions of the modifiable content-segment (i.e., all portions except those representing region where the supplemental content is to be overlaid) together with the supplemental content to be used as an overlay, to create the desired modifiable content-segment plus the supplemental content overlaid thereon.

As such, according to one example as illustrated in FIG. 3, by performing a content overlay operation, the content-presentation device 104 can overlay supplemental content on the AD SEGMENT B 302-B, thereby modifying it to AD SEGMENT B 304-B'. As a result, rather than outputting for presentation the RECEIPT SEQUENCE 304, the content-presentation device can instead output for presentation the SECOND MODIFIED SEQUENCE 308.

K. Tracking and Reporting Operation-Related Data

To help facilitate performance of various operations such as the content-presentation device 104 performing a content-modification operation and to help allow for the tracking and reporting of such operations, the content-modification system 100 and/or components thereof can track and report various operation-related data at various times and in various ways.

As just a few illustrative examples, responsive to certain operations being performed, such as those described herein, the fingerprint-matching server 106, the content-presentation device 104, and/or another entity can generate, store, and/or transmit messages that indicate (i) that a modifiable content-segment has been identified, (ii) that a channel has been identified/confirmed (perhaps based on a match detected as a result of a cold or hot match attempt), (iii) that an upcoming content modification opportunity on the identified channel has been identified, (iv) that supplemental content has been requested, (v) that supplemental content has been received, (vi), that a content-modification operation has started, (vii) that a content-modification operation has ended, and/or (viii) that a scheduled content-modification operation was aborted and/or not performed for any given reason. In some cases, these messages can include other metadata related to these operations. For example, the metadata can specify relevant timing information, device identifiers, channel identifiers, content segment identifiers, etc.

L. Watermark-Based Techniques

Although this disclosure has described the content-modification system 100 using fingerprint-based technology to perform various operations and to provide various features, in some examples, the content-modification system 100 can use watermark-based techniques instead of, or in addition to, fingerprint-based techniques, to perform these and other operations and to provide these and other features.

For example, as an alternative to the fingerprint-based technique described above in which the fingerprint-matching server 106 identifies the channel on which the second content is being received by the content-presentation device 104, the content-distribution system 102 or another entity can insert a channel identifier in the form of a watermark into the second content, such that the fingerprint-matching server 106, the content-presentation device 104, or another entity can extract the channel identifier and use it to identify the channel on which the second content is being received by the content-presentation device 104.

In this context, the content-modification system 100 can employ any watermark technique now known or later developed.

M. Operations Related to Using a Content-Transmission Delay-Based Selection of Reference Fingerprint Data Sets As discussed above, when the channel on which content is received by the content-presentation device is unidentified, the fingerprint-matching server 106 might need to make numerous cold match attempts between (i) the query fingerprint data representing such content and (ii) a large amount of reference fingerprint data sets, to determine whether the query fingerprint data matches at least a portion of any of the reference fingerprint data sets. To facilitate this, the fingerprint-matching server 106 might need to access (e.g., receive from the content-distribution system 102), and in some cases store in memory, many different reference fingerprint data sets, each representing a different one or more respective instances of content being transmitted by content-distribution systems on one or more respective channels. These numerous cold matching attempts can be time consuming, and in some cases, also computationally expensive for the fingerprint-matching server 106 in terms of memory and/or processing power. The time taken and computational expense can be even greater in scenarios where an end-user is frequently changing channels.

Thus, the disclosed methods and systems advantageously reduce the burden on the fingerprint-matching server 106 by having the content-presentation device 104 perform fingerprint matching and channel identification. Additionally, in accordance with the disclosed methods and systems, the fingerprint-matching server 106 can be configured to perform and/or can perform one or more acts to reduce the amount of reference fingerprint data sets stored and used by the content-presentation device 104 for the cold match attempts that the content-presentation device 104 performs to identify the channel. As a result, the number of cold match attempts can be reduced, and the amount of time, memory, and processing power needed by the content-presentation device 104 for the fingerprint matching process can be reduced. Furthermore, because the content-presentation device 104 is more quickly identifying the channel, the content-presentation device 104 can more quickly transmit an indication of the identified channel to the fingerprint-matching server 106, thereby speeding up the remainder of the process for the content-modification system 100 identifying, and the content-presentation device 104 acting on, content modification opportunities on the identified channel.

The fingerprint-matching server 106 can determine a content-transmission delay between the content-distribution system 102 and the content-presentation device 104. The act of determining the content-transmission delay can involve determining the content-transmission delay between the content-distribution system 102 and the content-presentation device 104 as a difference between a transmission-time stamp of content transmitted by the content-distribution system 102 and a receipt-time stamp of the same content received by the content-presentation device 104. For example, the transmitted content can be the first content and the received content can be the second content, where the second content is the same as the first content. As such, the transmission-time stamp can be the transmission-time stamp included in the first metadata discussed above and the receipt-time stamp can be the receipt-time stamp included in the second metadata discussed above. In alternative embodiments, such as those where other points in time are determined to be the point of transmission of the first content and/or the point of receipt of the second content, other time stamps can be determined and used in determining the content-transmission delay.

The act of determining the content-transmission delay can take other forms as well. For example, the act of determining the content-transmission delay can involve identifying one or more particular types of information, such as information associated with the content-presentation device 104, and mapping the identified information to the content-transmission delay. To facilitate this, the fingerprint-matching server 106 can store in memory, and/or receive from other devices within or outside of the content-modification system 100 that store in memory, mapping data (e.g., a table) that maps one or more different types of information associated with the content-presentation device 104 with a respective content-transmission delay. This mapping data is referred to herein as "first mapping data."

For example, the fingerprint-matching server 106 can identify a device identifier of the content-presentation device 104 and, using the first mapping data, map the identified device identifier to the content-transmission delay. As noted above, the fingerprint-matching server 106 can determine the device identifier in various ways, such as by receiving it from the content-presentation device 104, and/or by receiving other data from the content-presentation device 104 and using other mapping data to map the received data to determine the device identifier.

As another example, the fingerprint-matching server 106 can identify an IP address of the content-presentation device 104 and, using the first mapping data, map the identified IP address to the content-transmission delay. The fingerprint-matching server 106 can determine the IP address in various ways, such as by receiving it from the content-presentation device 104 or other device within or outside the content-modification system 100, and/or by receiving other data from the content-presentation device 104 or other device and using other mapping data to map the received data to determine the IP address.

As another example, the fingerprint-matching server 106 can identify content that is currently being, has been previously, and/or is scheduled to be presented on the content-presentation device 104, and, using the first mapping data, map the identified content to the content-transmission delay. The fingerprint-matching server 106 can determine the content identifier in various ways, such as by receiving it from the content-presentation device 104 or other device within or outside the content-modification system 100, and/or by receiving other data from the content-presentation device 104 or other device and using other mapping data to map the received data to determine the content identifier. In some examples, the content identifier can be, or be included as part of, the metadata that the fingerprint-matching server 106 can receive from the content-distribution system 102, the content-management system 108, and/or other devices within the content-modification system 100. For instance, the content identifier can be, include, or be included as part of a content segment identifier, program identifier, advertisement identifier, channel identifier, and/or other identifier associated with the content presented on the content-presentation device 104.

As another example, the fingerprint-matching server 106 can identify a geographic area (e.g., DMA) of the content-presentation device 104 and, using the first mapping data, map the identified geographic area to the content-transmission delay. In practice, content being transmitted from the content-modification system 102 to one content-presentation device in a particular geographic area might have a content-transmission delay similar to or approximately the same as content being transmitted from the content-modification system 102 to another content-presentation device in the same geographic area.

The first mapping data can be generated in various ways. For example, the mappings between the above-noted information and content-transmission delays can be entered manually. Additionally or alternatively, the fingerprint-matching server 106 can collect and store the above-noted information, and then determine content-transmission delays between various content-distribution systems and content-presentation devices over time and assign each determined content-transmission delay to a respective device identifier, IP address, content identifier, geographic area, etc. Other examples are possible as well. The first mapping data can be created, maintained, and updated over time to record associations between different types of information, including but not limited to the information described above.

Having determined the content-transmission delay between the content-distribution system 102 and the content-presentation device 104, the fingerprint-matching server 106 can use at least the determined content-transmission delay as a basis to select, from among a plurality of reference fingerprint data sets, a reference fingerprint data set that corresponds with the determined content-transmission delay.

To facilitate this, for example, the fingerprint-matching server 106 can store in memory, and/or receive from other devices within or outside of the content-modification system 100 that store in memory, mapping data (e.g., a table) that maps each content-transmission delay of a plurality of content-transmission delays to a respective reference fingerprint data set. This mapping data is referred to herein as "second mapping data." In some examples, the first mapping data can include the second mapping data. In other examples, the first mapping data and the second mapping data can be stored at separate locations (e.g., stored separately within the same computing device or stored remote from each other in separate computing devices). In either case, any information included in the first mapping data can be mapped to any information in the second mapping data, and vice versa.

The act of using at least the determined content-transmission delay as a basis to select, from among a plurality of reference fingerprint data sets, a reference fingerprint data set that corresponds with the determined content-transmission delay can involve referring to the second mapping data to select the reference fingerprint data set that the second mapping data maps to the determined content-transmission delay. The second mapping data can include the selected reference fingerprint data set or, once the selected reference fingerprint data set(s) is/are identified, the fingerprint-matching server 106 can retrieve the selected reference fingerprint data set from a database or database partition that stores the selected reference fingerprint data set. The database or database partition can be a general database/partition or can be assigned for storing reference fingerprint data set(s) associated with a particular content-transmission delay.

The second mapping data can be generated in various ways. For example, the mappings between content-transmission delays and reference fingerprint data sets can be entered manually. Additionally or alternatively, the fingerprint-matching server 106 can store a list of content-transmission delays, and then receive reference fingerprint data sets over time and assign each received reference fingerprint data set to a respective content-transmission delay. Other examples are possible as well. In some implementations, another device of the content-modification system 100, different from the fingerprint-matching server 106, can generate and/or store the second mapping data. The act of using at least the determined content-transmission delay as a basis to select a reference fingerprint data set that corresponds with the determined content-transmission delay can take other forms as well.

In some embodiments, additional information can be stored in memory and/or included as part of the second mapping data as well. For example, the second mapping data can map each reference fingerprint data set to a particular channel identifier with which the reference fingerprint data set is associated. As another example, the second mapping data can map each device identifier of a plurality of device identifiers for content-presentation devices to historical content consumption data, demographic data, and/or other data that is associated with that device identifier. Thus, the second mapping data can be created, maintained, and updated over time to record associations between different types of information, including but not limited to reference fingerprint data sets, channel identifiers, content-transmission delays, device identifiers for content-presentation devices, historical content consumption data, and/or demographic data.

In line with the discussion above, the fingerprint-matching server 106 can use additional information as a basis to select the reference fingerprint data set as well, such as historical content consumption data, demographic data, and/or other data that is associated with the device identifier or other identifying information for the content-presentation device 104. In situations where the device identifier of the content-presentation device 104 has been identified, for instance, the fingerprint-matching server 106 can use the device identifier to look up historical content consumption data, demographic data, and/or other data for the content-presentation device 104. Furthermore, in situations where additional information is used to select the reference fingerprint data set, the fingerprint-matching server 106 can use the determined content-transmission delay and the additional information as a basis to identify which reference fingerprint data set is associated with both the determined content-transmission delay and the additional information and select the identified reference fingerprint data set. By way of example, the second mapping data can map a reference fingerprint data set to a particular content-transmission delay and a particular type of content historically consumed by the content-presentation device 104. As another example, the second mapping data can map a reference fingerprint data set to a particular content-transmission delay and a particular DMA of the content-presentation device 104. The fingerprint-matching server 106 can use the additional information to inform which reference fingerprint data set to select in other ways as well.

As such, additional information, such as historical content consumption data for the content-presentation device 104, can be advantageously used to further refine (e.g., reduce) the amount of reference fingerprint data sets considered for determining matches and for channel identification.

After the reference fingerprint data set is selected, the fingerprint-matching server 106 can transmit the selected reference fingerprint data set to the content-presentation device 104. As such, the content-presentation device 104 can then detect a match between the query fingerprint data and at least a portion of reference fingerprint data in the selected reference fingerprint data set that the content-presentation device 104 receives from the fingerprint-matching server 106. The match can be detected in the same or similar way as described above with respect to cold match attempts. Responsive to detecting the match, the content-presentation device 104 can perform an action. The action can take various forms, including but not limited to actions in connection with other operations described above that facilitate the content-presentation device 104 performing a content-modification operation, such as operations for the content-presentation device 104 identifying the channel and/or the content-presentation device 104 transmitting an indication of the identified channel to the fingerprint-matching server 106.

As noted above, the metadata associated with query fingerprint data might not identify the channel on which the content-presentation device 104 is receiving content. Thus, the action that the content-presentation device 104 performs can involve identifying the channel. For example, at least the portion of the reference fingerprint data in the selected reference fingerprint data set that the content-presentation device 104 uses to detect a match can correspond with a channel, and the action can involve identifying the channel as being the one on which the content-presentation device 104 is receiving content. For instance, the content-presentation device 104 can identify the channel based on the channel identifier metadata associated with the reference fingerprint data (e.g., the first metadata associated with the first fingerprint data, which the content-presentation device 104 can receive from the content-distribution system 102 and/or the fingerprint-matching server 106).

As further noted above, after the content-presentation device 104 identifies the channel on which the content-presentation device 104 is receiving content, the content-presentation device 104 can perform additional acts, such as (i) generating metadata associated with the identified channel on which the content-presentation device 104 is receiving the content, (ii) transmitting an indication of the identified channel and the associated metadata (e.g., transmit the indication of the identified channel to the fingerprint-matching server 106), and/or (iii) performing a content-modification operation in connection with the identified content modification opportunity on the identified channel. As such, the act of performing the action in response to detecting the match can involve performance of any one or more of these actions. Other actions are possible as well.

In practice, the content-presentation device 104 is likely to transmit, and the fingerprint-matching server 106 is likely receive, many queries with query fingerprint data. In such situations, the fingerprint-matching server 106 can perform one or more of the operations described above, as appropriate for each of the many queries, such as directing each such query from the content-presentation device 104 to the appropriate reference fingerprint data set for the content-transmission delay between the content-presentation device 104 and a content-distribution system.

Figure 5:
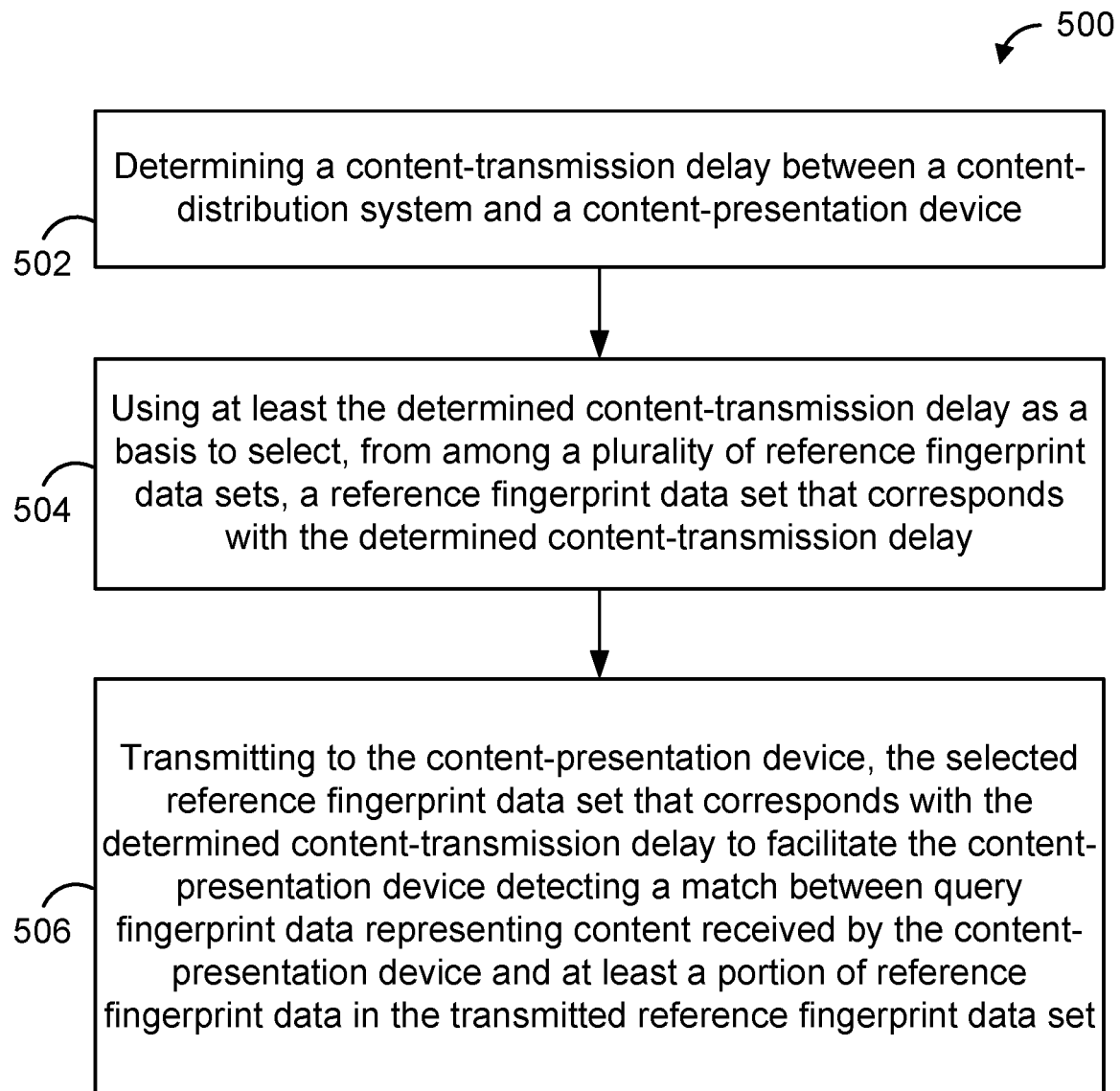
FIG. 5 is a flow chart of an example method.

FIG. 5 is a flow chart of an example method 500. At block 502, the method 500 includes determining a content-transmission delay between a content-distribution system and a content-presentation device.

At block 504, the method 500 includes using at least the determined content-transmission delay as a basis to select, from among a plurality of reference fingerprint data sets, a reference fingerprint data set that corresponds with the determined content-transmission delay.

At block 506, the method 500 includes transmitting to the content-presentation device, the selected reference fingerprint data set that corresponds with the determined content-transmission delay to facilitate the content-presentation device detecting a match between query fingerprint data representing content received by the content-presentation device and at least a portion of reference fingerprint data in the transmitted reference fingerprint data set.

The method 500 and related acts can be performed at least in part by the fingerprint-matching server 106. In some implementations, the method 500 and related acts can be performed at least in part by another device within the content-modification system 100.

Figure 6:
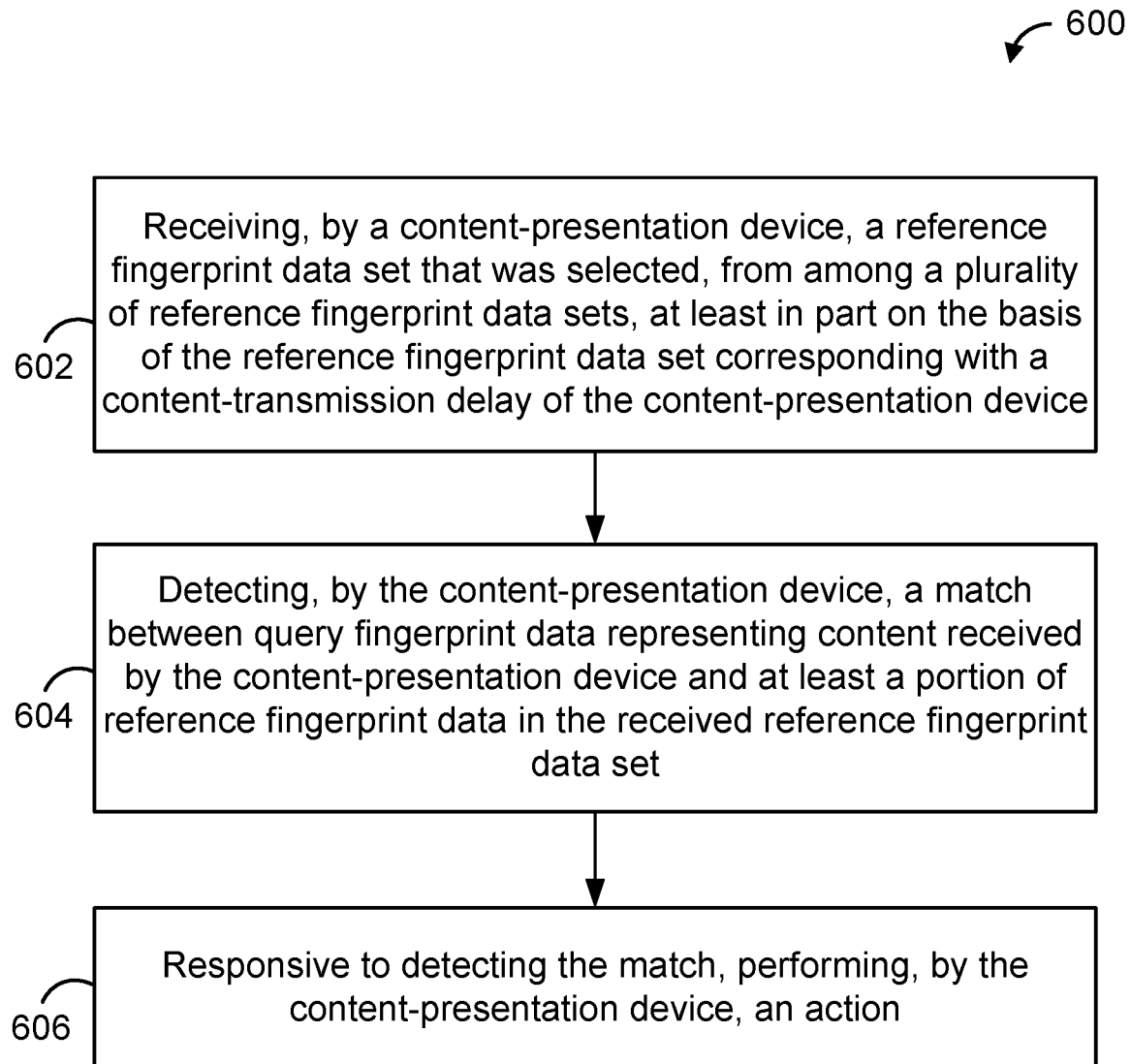
FIG. 6 is a flow chart of an example method.

FIG. 6 is a flow chart of another example method 600. At block 602, the method 600 includes receiving, by a content-presentation device, a reference fingerprint data set that was selected, from among a plurality of reference fingerprint data sets, at least in part on the basis of the reference fingerprint data set corresponding with a content-transmission delay of the content-presentation device.

At block 604, the method 600 includes detecting, by the content-presentation device, a match between query fingerprint data representing content received by the content-presentation device and at least a portion of reference fingerprint data in the received reference fingerprint data set.

At block 606, the method 600 includes responsive to detecting the match, performing, by the content-presentation device, an action.

The method 600 and related acts can be performed at least in part by the content-presentation device 104. In some implementations, the method 600 and related acts can be performed at least in part by another device within the content-modification system 100.

Figure 7:
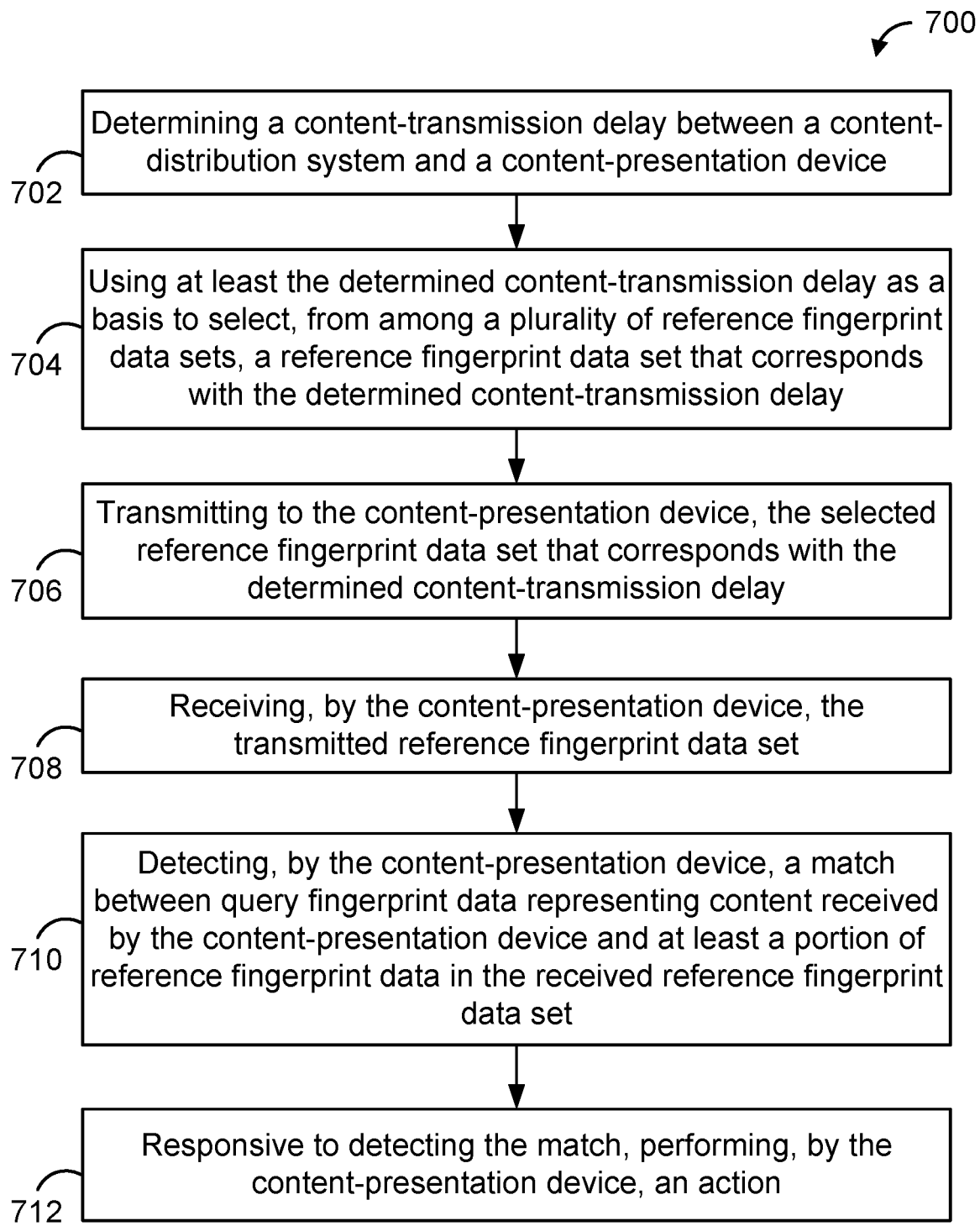
FIG. 7 is a flow chart of an example method.

FIG. 7 is a flow chart of another example method 700. At block 702, the method 700 includes determining a content-transmission delay between a content-distribution system and a content-presentation device.

At block 704, the method 700 includes using at least the determined content-transmission delay as a basis to select, from among a plurality of reference fingerprint data sets, a reference fingerprint data set that corresponds with the determined content-transmission delay.

At block 706, the method 700 includes transmitting to the content-presentation device, the selected reference fingerprint data set that corresponds with the determined content-transmission delay.

At block 708, the method 700 includes receiving, by the content-presentation device, the transmitted reference fingerprint data set.

At block 710, the method 700 includes detecting, by the content-presentation device, a match between query fingerprint data representing content received by the content-presentation device and at least a portion of reference fingerprint data in the received reference fingerprint data set.

At block 712, the method 700 includes responsive to detecting the match, performing, by the content-presentation device, an action.

Blocks 702-706 of the method 700 and related acts can be performed at least in part by the fingerprint-matching server 106. In some implementations, blocks 702-706 of the method 700 and related acts can be performed at least in part by another device within the content-modification system 100.

As discussed above, implementations of the disclosed methods and systems provide technological improvements that are particular to computer networks and computing systems, for example, content-modification systems such as content-modification system 100.

Various technological problems can exist in systems configured to produce and provide content (e.g., targeted content) to end-users, such as inefficiency and computational complexity. These technological problems can be particularly apparent in content-modification systems where numerous content-distribution systems are transmitting large amounts of video content over long periods of time to numerous content-presentation devices, and when it is desired to modify many content segments received and presented by these content-presentation devices. The above-described operations and various implementations thereof can be integrated into these and other content-modification system environments to wholly or partially solve these and other technological problems.

For example, as noted above, implementations of this disclosure improve the content modification process as a whole by enabling content-presentation devices to more quickly identify the channels on which the content-presentation devices are receiving content, thereby enabling the content-modification system as a whole to more quickly identify and act on content modification opportunities. In practice, operations for modifying and providing content to end-users typically occur within short durations of time (e.g., seconds or less). Thus, the disclosed operations help make aspects of content modification more efficient, namely fingerprint matching, channel identification, and, importantly, actions that are performed as a result of fingerprint matching and channel identification, such as identifying an upcoming content modification opportunity and/or preparing the content-presentation device to perform a content-modification operation in connection with the upcoming content modification opportunity. This helps ensure that such operations are reliably performed in the time desired, including in large content-modification systems.

As another example, as noted above, because implementations of this disclosure can use a content-transmission delay (and perhaps additional information as well) to limit which reference fingerprint data sets are considered, these implementations can reduce the amount of memory and/or processing power that might be needed by content-presentation devices to store reference fingerprint data sets, perform fingerprint matching, and identify channels. By making the fingerprint matching process and subsequent actions less computationally expensive in this way as well, aspects of content modification can be made even more efficient and reliable.

These and other improvements have been described in detail herein, although the operations described herein are for purposes of example and implementations of the disclosed methods and systems can provide other improvements as well.

IV. Example Variations

Although the examples and features described above have been described in connection with specific entities and specific operations, in practice, there are likely to be many instances of these entities and many instances of these operations being performed, perhaps contemporaneously or simultaneously, on a large-scale basis. Indeed, in practice, the content-modification system 100 is likely to include many content-distribution systems (each potentially transmitting content on many channels) and many content-presentation devices, with some or all of the described operations being performed on a routine and repeating basis in connection with some or all of these entities.

In addition, although some of the operations described in this disclosure have been described as being performed by a particular entity, the operations can be performed by any entity, such as the other entities described in this disclosure. Further, although the operations have been recited in a particular order and/or in connection with example temporal language, the operations need not be performed in the order recited and need not be performed in accordance with any particular temporal restrictions. However, in some instances, it can be desired to perform one or more of the operations in the order recited, in another order, and/or in a manner where at least some of the operations are performed contemporaneously/simultaneously. Likewise, in some instances, it can be desired to perform one or more of the operations in accordance with one more or the recited temporal restrictions or with other timing restrictions. Further, each of the described operations can be performed responsive to performance of one or more of the other described operations. Also, not all of the operations need to be performed to achieve one or more of the benefits provided by the disclosure, and therefore not all of the operations are required.

Although certain variations have been described in connection with one or more examples of this disclosure, these variations can also be applied to some or all of the other examples of this disclosure as well and therefore aspects of this disclosure can be combined and/or arranged in many ways. The examples described in this disclosure were selected at least in part because they help explain the practical application of the various described features.

Also, although select examples of this disclosure have been described, alterations and permutations of these examples will be apparent to those of ordinary skill in the art. Other changes, substitutions, and/or alterations are also possible without departing from the invention in its broader aspects as set forth in the following claims.

What is claimed is:

1. A method comprising:
    determining a content-transmission delay between a content-distribution system and a content-presentation device;
    using at least the determined content-transmission delay as a basis to select, from among a plurality of reference fingerprint data sets, a reference fingerprint data set that corresponds with the determined content-transmission delay, wherein using at least the determined content-transmission delay as a basis to select the reference fingerprint data set that corresponds with the determined content-transmission delay comprises:
        accessing mapping data that maps each content-transmission delay of a plurality of content-transmission delays to a respective reference fingerprint data set of the plurality of reference fingerprint data sets, and
        using the mapping data as a basis to select the reference fingerprint data set that the mapping data maps to the determined content-transmission delay; and
    transmitting to the content-presentation device, the selected reference fingerprint data set that corresponds with the determined content-transmission delay to facilitate the content-presentation device detecting a match between query fingerprint data representing content received by the content-presentation device and at least a portion of reference fingerprint data in the transmitted reference fingerprint data set.

2. The method of claim 1, wherein determining the content-transmission delay between the content-distribution system and the content-presentation device comprises determining the content-transmission delay as a difference between a transmission-time stamp of content transmitted by the content-distribution system and a receipt-time stamp of the same content received by the content-presentation device.

3. The method of claim 1, wherein determining the content-transmission delay between the content-distribution system and the content-presentation device comprises:
    determining a device identifier of the content-presentation device;
    accessing second mapping data that maps each of a plurality of device identifiers of content-presentation devices to a respective content-transmission delay; and
    using the second mapping data as a basis to select the content-transmission delay that the mapping data maps to the determined device identifier.

4. The method of claim 1, wherein determining the content-transmission delay between the content-distribution system and the content-presentation device comprises:
    determining an Internet Protocol (IP) address of the content-presentation device;
    accessing second mapping data that maps each IP address of a plurality of IP addresses to a respective content-transmission delay; and using the second mapping data as a basis to select the content-transmission delay that the mapping data maps to the determined IP address.

5. The method of claim 1, wherein determining the content-transmission delay between the content-distribution system and the content-presentation device comprises:
   determining geographic area of the content-presentation device;
   accessing second mapping data that maps each geographic area of a plurality of geographic areas to a respective content-transmission delay; and
   using the second mapping data as a basis to select the content-transmission delay that the mapping data maps to the determined geographic area.

6. The method of claim 1, further comprising:
   based on historical content consumption data for the content-presentation device, determining a type of content historically received by the content-presentation device,
   wherein the mapping data further maps each reference fingerprint data set of the plurality of reference fingerprint data sets to a respective particular type of content historically received by content-presentation devices, and
   wherein using at least the determined content-transmission delay as a basis to select the reference fingerprint data set that corresponds with the determined content-transmission delay further comprises using the mapping data as a basis to select the reference fingerprint data set that the mapping data maps to the determined content-transmission delay and to the determined type of content historically received by the content-presentation device.

7. The method of claim 1, wherein the content-presentation device is configured to perform a set of operations comprising:
   receiving the transmitted reference fingerprint data set;
   detecting a match between the query fingerprint data and the at least a portion of reference fingerprint data in the received reference fingerprint data set; and
   responsive to detecting the match, performing an action.

8. The method of claim 7, wherein performing the action comprises performing an action that facilitates the content-presentation device performing a content-modification operation.

9. The method of claim 8, wherein the at least a portion of reference fingerprint data in the selected reference fingerprint data set corresponds with a channel, and wherein performing the action comprises identifying the channel as being the one on which the content-presentation device is presenting or receiving content.

10. The method of claim 1, wherein the content-distribution system comprises a television-broadcast station,
    wherein the content-presentation device comprises a television set, and
    wherein the content received by the content-presentation device comprises video content.

11. A non-transitory computer-readable storage medium, having stored thereon program instructions that, upon execution by a processor, cause performance of a set of operations comprising:
    determining a content-transmission delay between a content-distribution system and a content-presentation device;
    using at least the determined content-transmission delay as a basis to select, from among a plurality of reference fingerprint data sets, a reference fingerprint data set that corresponds with the determined content-transmission delay, wherein using at least the determined content-transmission delay as a basis to select the reference fingerprint data set that corresponds with the determined content-transmission delay comprises:
       accessing mapping data that maps each content-transmission delay of a plurality of content-transmission delays to a respective reference fingerprint data set of the plurality of reference fingerprint data sets, and
       using the mapping data as a basis to select the reference fingerprint data set that the mapping data maps to the determined content-transmission delay; and
    transmitting to the content-presentation device, the selected reference fingerprint data set that corresponds with the determined content-transmission delay to facilitate the content-presentation device detecting a match between query fingerprint data representing content received by the content-presentation device and at least a portion of reference fingerprint data in the transmitted reference fingerprint data set.

12. The non-transitory computer-readable storage medium of claim 11, wherein determining the content-transmission delay between the content-distribution system and the content-presentation device comprises:
    determining a device identifier of the content-presentation device;
    accessing second mapping data that maps each of a plurality of device identifiers of content-presentation devices to a respective content-transmission delay; and
    using the second mapping data as a basis to select the content-transmission delay that the mapping data maps to the determined device identifier.

13. The non-transitory computer-readable storage medium of claim 11, wherein determining the content-transmission delay between the content-distribution system and the content-presentation device comprises:
    determining an Internet Protocol (IP) address of the content-presentation device;
    accessing second mapping data that maps each IP address of a plurality of IP addresses to a respective content-transmission delay; and
    using the second mapping data as a basis to select the content-transmission delay that the mapping data maps to the determined IP address.

14. The non-transitory computer-readable storage medium of claim 11, wherein determining the content-transmission delay between the content-distribution system and the content-presentation device comprises:
    determining geographic area of the content-presentation device;
    accessing second mapping data that maps each geographic area of a plurality of geographic areas to a respective content-transmission delay; and
    using the second mapping data as a basis to select the content-transmission delay that the mapping data maps to the determined geographic area.

15. The non-transitory computer-readable storage medium of claim 11, the set of operations further comprising:
    based on historical content consumption data for the content-presentation device, determining a type of content historically received by the content-presentation device,
    wherein the mapping data further maps each reference fingerprint data set of the plurality of reference fingerprint data sets to a respective particular type of content historically received by content-presentation devices, and wherein using at least the determined content-transmission delay as a basis to select the reference fingerprint data set that corresponds with the determined content-transmission delay further comprises using the mapping data as a basis to select the reference fingerprint data set that the mapping data maps to the determined content-transmission delay and to the determined type of content historically received by the content-presentation device.

16. The non-transitory computer-readable storage medium of claim 11, wherein the content-presentation device is configured to perform a set of operations comprising:

receiving the transmitted reference fingerprint data set;
detecting a match between the query fingerprint data and the at least a portion of reference fingerprint data in the received reference fingerprint data set; and
responsive to detecting the match, performing an action.

17. The non-transitory computer-readable storage medium of claim 16, wherein performing the action comprises performing an action that facilitates the content-presentation device performing a content-modification operation.

18. The non-transitory computer-readable storage medium of claim 17, wherein the at least a portion of reference fingerprint data in the selected reference fingerprint data set corresponds with a channel, and wherein performing the action comprises identifying the channel as being the one on which the content-presentation device is presenting or receiving content.

19. The non-transitory computer-readable storage medium of claim 11, wherein the content-distribution system comprises a television-broadcast station, wherein the content-presentation device comprises a television set, and wherein the content received by the content-presentation device comprises video content.

20. A computing system comprising:
a processor; and
a non-transitory computer-readable storage medium, having stored thereon program instructions that, upon execution by the processor, cause performance of a set of operations comprising:
determining a content-transmission delay between a content-distribution system and a content-presentation device;
using at least the determined content-transmission delay as a basis to select, from among a plurality of reference fingerprint data sets, a reference fingerprint data set that corresponds with the determined content-transmission delay, wherein using at least the determined content-transmission delay as a basis to select the reference fingerprint data set that corresponds with the determined content-transmission delay comprises:
accessing mapping data that maps each content-transmission delay of a plurality of content-transmission delays to a respective reference fingerprint data set of the plurality of reference fingerprint data sets, and
using the mapping data as a basis to select the reference fingerprint data set that the mapping data maps to the determined content-transmission delay; and
transmitting to the content-presentation device, the selected reference fingerprint data set that corresponds with the determined content-transmission delay to facilitate the content-presentation device detecting a match between query fingerprint data representing content received by the content-presentation device and at least a portion of reference fingerprint data in the transmitted reference fingerprint data set.

* * * * *